United States Patent
Park et al.

(10) Patent No.: US 12,524,976 B2
(45) Date of Patent: Jan. 13, 2026

(54) HEAD-MOUNTED DEVICE DISPLAYING SCREEN CORRESPONDING TO CONTENT AND METHOD FOR OPERATING THE SAME

(71) Applicant: SAMSUNG ELECTRONICS CO., LTD., Suwon-si (KR)

(72) Inventors: Hungi Park, Suwon-si (KR); Sangheon Kim, Suwon-si (KR); Youngjung Kim, Suwon-si (KR); Miji Park, Suwon-si (KR); Jinwan An, Suwon-si (KR); Sangyong Lee, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/784,556

(22) Filed: Jul. 25, 2024

(65) Prior Publication Data
US 2025/0037389 A1    Jan. 30, 2025

Related U.S. Application Data

(63) Continuation of application No. PCT/KR2024/010021, filed on Jul. 12, 2024.

(30) Foreign Application Priority Data

Jul. 25, 2023   (KR) .................. 10-2023-0096896
Oct. 17, 2023   (KR) .................. 10-2023-0139012

(51) Int. Cl.
  G06T 19/00    (2011.01)
  G06F 3/01     (2006.01)
  G06F 3/14     (2006.01)

(52) U.S. Cl.
  CPC ............ *G06T 19/006* (2013.01); *G06F 3/013* (2013.01); *G06F 3/017* (2013.01); *G06F 3/14* (2013.01); *G06F 3/012* (2013.01)

(58) Field of Classification Search
  CPC .......... G06F 3/011; G06F 3/012; G06F 3/013; G06F 3/017; G06F 3/14; G06T 19/006
  See application file for complete search history.

(56) References Cited

U.S. PATENT DOCUMENTS 10,062,209 B2 *  8/2018  Suzuki .................. G06T 19/006
11,695,908 B2    7/2023  Takahashi et al.
(Continued)

FOREIGN PATENT DOCUMENTS

CN    108786114 A    11/2018
CN    115098524 A     9/2022
(Continued)

OTHER PUBLICATIONS

International Search Report dated Oct. 18, 2024, issued by the International Searching Authority in International Application No. PCT/KR2024/010021.
(Continued)

*Primary Examiner* — Ryan A Lubit
(74) *Attorney, Agent, or Firm* — Sughrue Mion, PLLC

(57) ABSTRACT

A head-mounted device may comprise: a display; memory comprising storage media storing instructions; and at least one processor comprising processing circuitry, wherein the instructions, when executed by the at least one processor individually or collectively, cause the head-mounted device to: provide content corresponding to a first space through the display based on a first safety zone corresponding to the first space; based on obtaining a request related to content corresponding to a second space, identify whether an execution condition of the second space is satisfied based on the (Continued)

first safety zone; display at least one affordance, related to a second safety zone corresponding to the second space, through the display based on the execution condition of the second space being not satisfied; and based on an input corresponding to the at least one affordance, provide the content corresponding to the second space, through the display, based on the second safety zone.

20 Claims, 36 Drawing Sheets

(56) References Cited

U.S. PATENT DOCUMENTS

| | | | |
|---|---|---|---|
| 2017/0359569 | A1 | 12/2017 | Stafford |
| 2018/0093186 | A1* | 4/2018 | Black ..................... A63F 13/25 |
| 2019/0164343 | A1 | 5/2019 | Bailey et al. |
| 2019/0287495 | A1* | 9/2019 | Mathur .................. G09G 5/391 |
| 2020/0134895 | A1 | 4/2020 | Pollard et al. |
| 2020/0258481 | A1* | 8/2020 | Woo ........................ G06T 11/00 |
| 2020/0334907 | A1* | 10/2020 | Bender ............... G06F 3/04815 |
| 2021/0283503 | A1 | 9/2021 | Challinor |
| 2023/0041942 | A1* | 2/2023 | Ishikawa ............ G02B 27/0172 |
| 2024/0071002 | A1* | 2/2024 | Phillips ................ G06T 19/006 |
| 2024/0296580 | A1 | 9/2024 | Li et al. |
| 2024/0325889 | A1 | 10/2024 | Nomura et al. |
| 2024/0378835 | A1 | 11/2024 | Nomura et al. |
| 2024/0394930 | A1* | 11/2024 | Keskin ................... G01S 13/89 |
| 2025/0124614 | A1 | 4/2025 | Uchihara |

FOREIGN PATENT DOCUMENTS

| | | |
|---|---|---|
| CN | 115698905 A | 2/2023 |
| EP | 4 482 164 A1 | 12/2024 |
| JP | 2019-21331 A | 2/2019 |
| JP | 2024-4662 A | 1/2024 |
| KR | 10-2021-0071083 A | 6/2021 |
| WO | 2022/246795 A1 | 12/2022 |

OTHER PUBLICATIONS

Written Opinion dated Oct. 18, 2024, issued by the International Searching Authority in International Application No. PCT/KR2024/010021.

Meta Quest, "Oculus Quest Basics Tutorial", YouTube, https://youtu.be/pVFcsedWsKE, May 20, 2019. (2 pages total).

Meta Quest, "Quest 2 Setting Up Guardian", YouTube, https://www.youtube.com/watch?v=GojevL05Avw, Nov. 13, 2021. (2 pages total).

PlayStation Access, "PlayStation VR2", YouTube, https://youtu.be/C4zilBP2HJM?t=137, Feb. 16, 2023. (2 pages total).

* cited by examiner

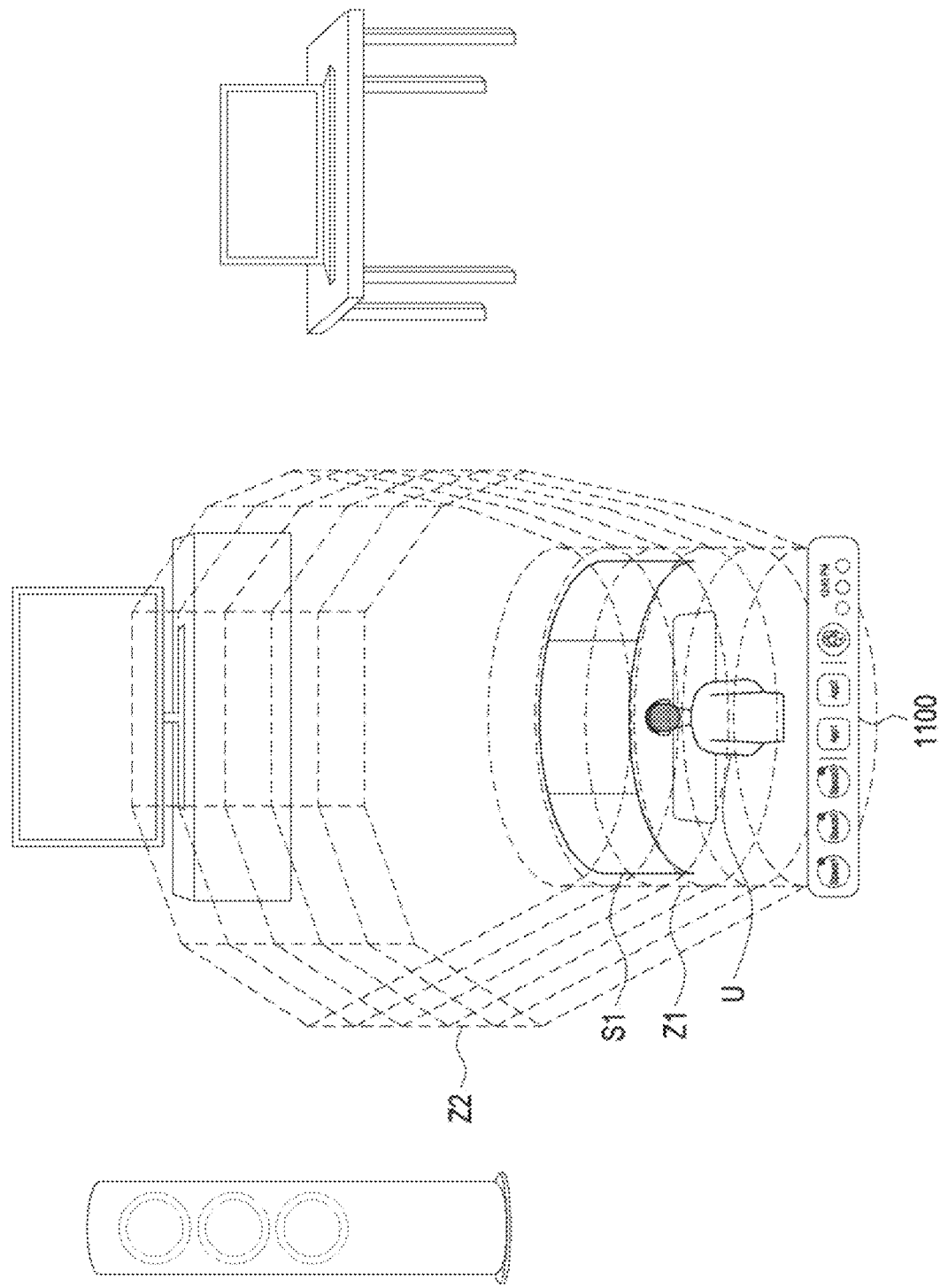

HEAD-MOUNTED DEVICE DISPLAYING SCREEN CORRESPONDING TO CONTENT AND METHOD FOR OPERATING THE SAME

CROSS-REFERENCE TO RELATED APPLICATIONS

This application is a continuation of International Application No. PCT/KR2024/010021 designating the United States, filed on Jul. 12, 2024, in the Korean Intellectual Property Receiving Office and claiming priority to Korean Patent Application No. 10-2023-0096896, filed on Jul. 25, 2023 and Korean Patent Application No. 10-2023-0139012, filed on Oct. 17, 2023, in the Korean Intellectual Property Office, the disclosures of all of which are incorporated by reference herein in their entireties.

BACKGROUND

1. Field

The disclosure relates to a head-mounted device displaying a screen corresponding to content according to one or more embodiments and a method for operating the same.

2. Description of Related Art

Various types of electronic devices, such as mobile communication terminals, personal digital assistants (PDAs), electronic schedulers, smartphones, tablet personal computers (PCs), and wearable devices, are widely used. For example, electronic devices may provide virtual reality (VR), which allows users to have a realistic experience in a computer-generated virtual world, augmented reality (VR), which adds virtual information (or objects) to the real world, or mixed reality (MR), which combines virtual reality and augmented reality.

Wearable electronic devices that are used while being worn on users, such as head-mounted devices, require compact space utilization and may need technology for providing light corresponding to the display of a screen on the display to the users' eyes through lenses for space utilization purposes.

The above-described information may be provided as related art for the purpose of helping understanding of the disclosure. No claim or determination is made as to whether any of the foregoing is applicable as background art in relation to the disclosure.

SUMMARY

According to one or more example embodiments, a head-mounted device may comprise: a display; memory comprising one or more storage media storing instructions; and at least one processor comprising processing circuitry, wherein the instructions, when executed by the at least one processor individually or collectively, cause the head-mounted device to: provide content corresponding to a first space through the display based on a first safety zone corresponding to the first space; based on obtaining a request related to content corresponding to a second space, identify whether an execution condition of the second space is satisfied based on the first safety zone; display at least one affordance, related to a second safety zone corresponding to the second space, through the display based on the execution condition of the second space being not satisfied; and based on an input corresponding to the at least one affordance, provide the content corresponding to the second space, through the display, based on the second safety zone.

According to one or more example embodiments, an operation method of a head-mounted device may comprise: providing content corresponding to a first space through a display based on a first safety zone corresponding to the first space; based on obtaining a request related to content corresponding to a second space, identifying whether an execution condition of the second space is satisfied based on the first safety zone; displaying at least one affordance, related to a second safety zone corresponding to the second space, through the display based on the execution condition of the second space being not satisfied; and based on an input corresponding to the at least one affordance, providing the content corresponding to the second space, through the display, based on the second safety zone.

According to one or more example embodiments, a non-transitory computer readable medium stores instructions that, when executed by at least one processor of a head-mounted device individually or collectively, cause the head-mounted device to: provide content corresponding to a first space through a display based on a first safety zone corresponding to the first space; based on obtaining a request related to content corresponding to a second space, identify whether an execution condition of the second space is satisfied based on the first safety zone; display at least one affordance related to a second safety zone corresponding to the second space through the display based on the execution condition of the second space being not satisfied; and based on an input corresponding to the at least one affordance, provide the content corresponding to the second space, through the display, based on the second safety zone.

According to one or more example embodiments, a head-mounted device, may include: a display; memory storing instructions; and at least one processor, wherein the instructions, when executed by the at least one processor, cause the head-mounted device to: activate a first safety zone based on a request for a first space in an extended reality environment; in response to a request for execution of an application that requires a second space, determine whether a size of the activated first safety zone conforms to an execution condition of the application; provide a spatial lock screen comprising at least one affordance corresponding to a gesture input, based on the size of the activated first safety zone not conforming to the execution condition of the application; and based on receipt of the gesture input, unlock the spatial lock screen and activate the second safety zone.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 19 illustrates an activated state of a second safety zone according to one or more embodiments of the disclosure;

DETAILED DESCRIPTION

Figure 1:
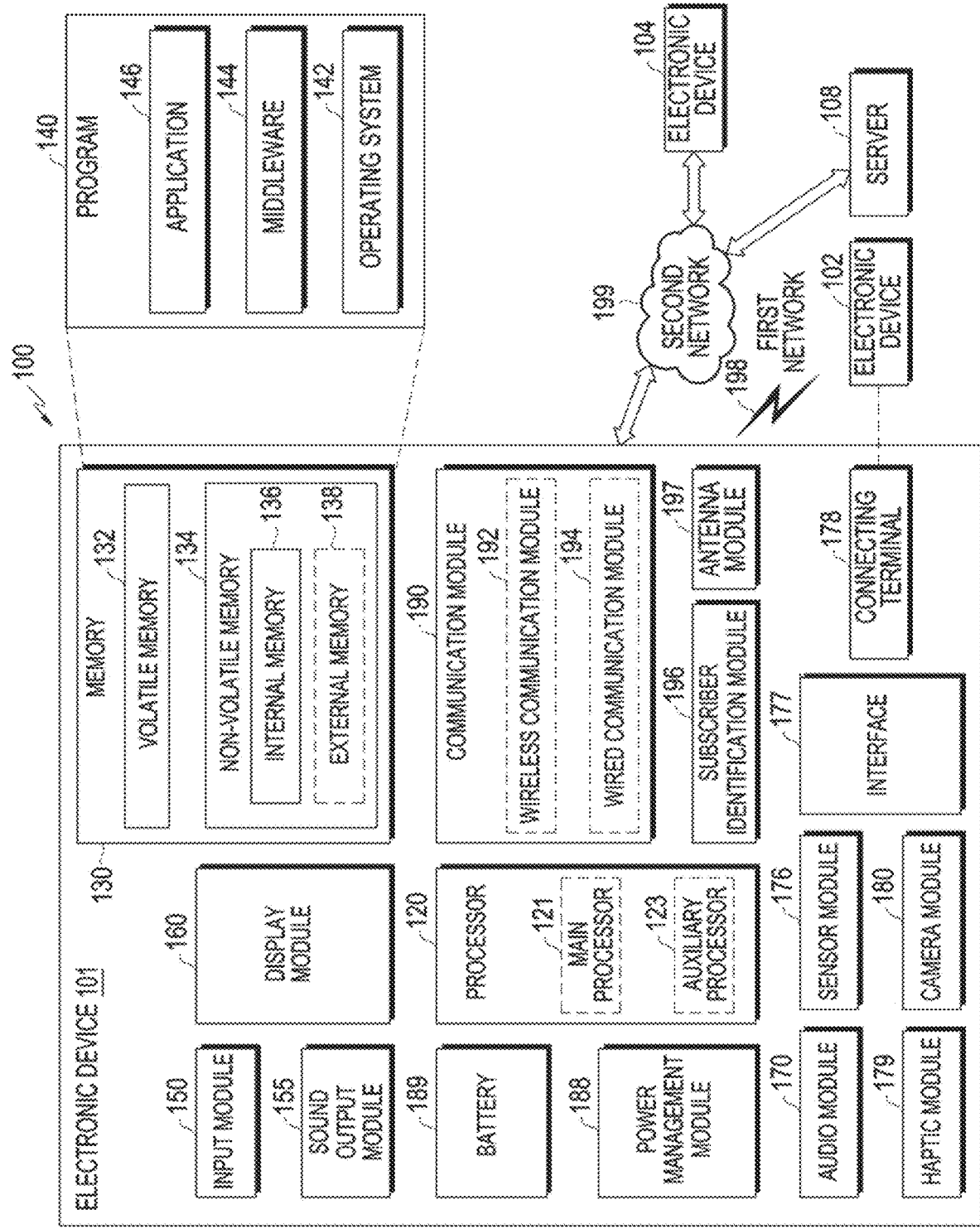
FIG. 1 is a block diagram illustrating an electronic device in a network environment according to one or more embodiments of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
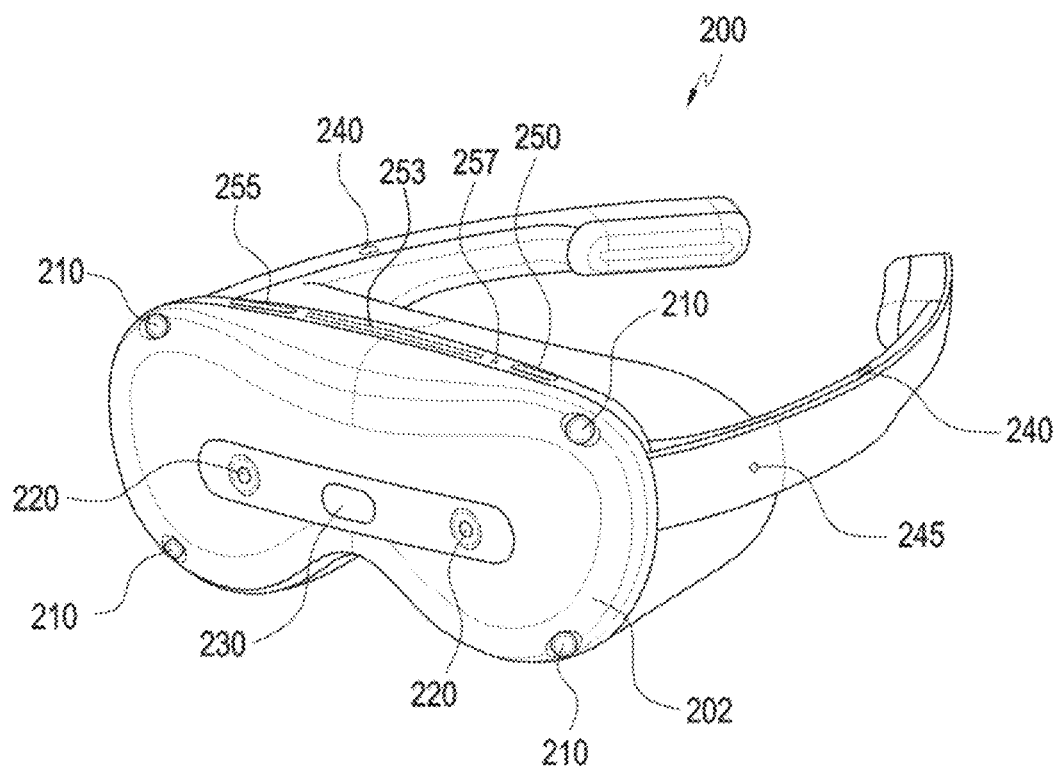
FIG. 2 is a front perspective view illustrating a head-mounted device according to one or more embodiments of the disclosure.
Figure 3:
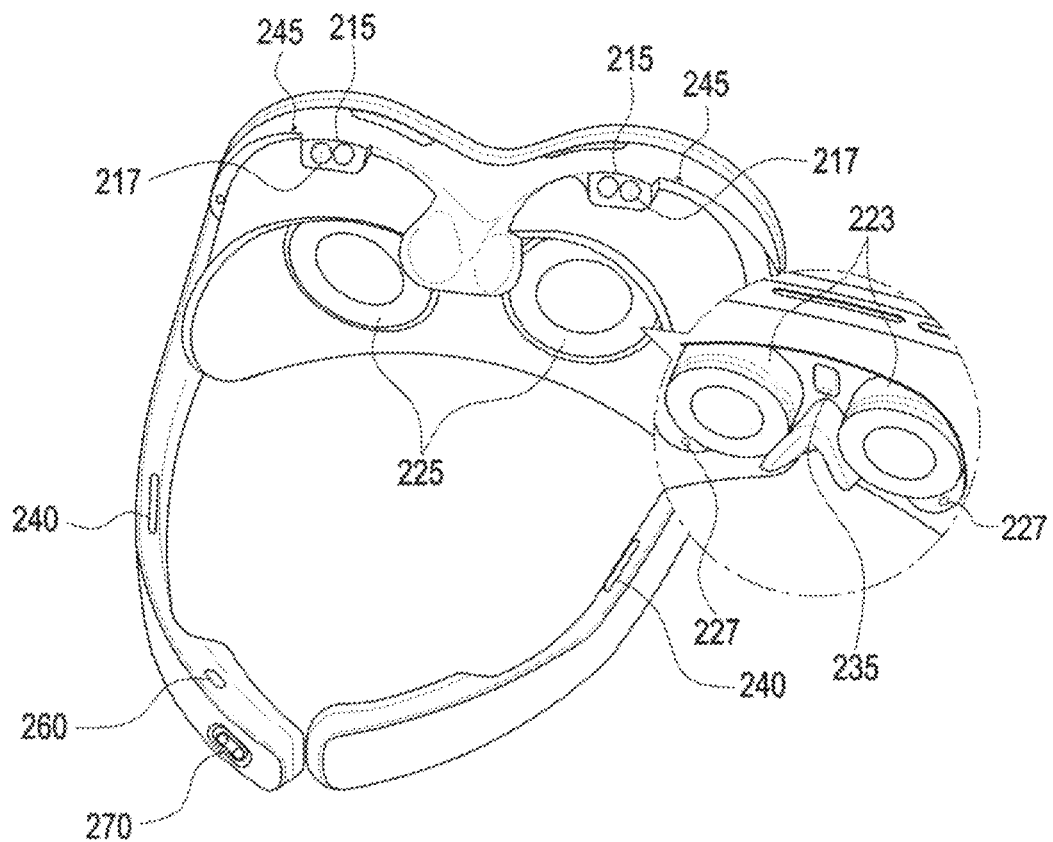
FIG. 3 is a rear perspective view illustrating a head-mounted device according to one or more embodiments of the disclosure.
Figure 4:
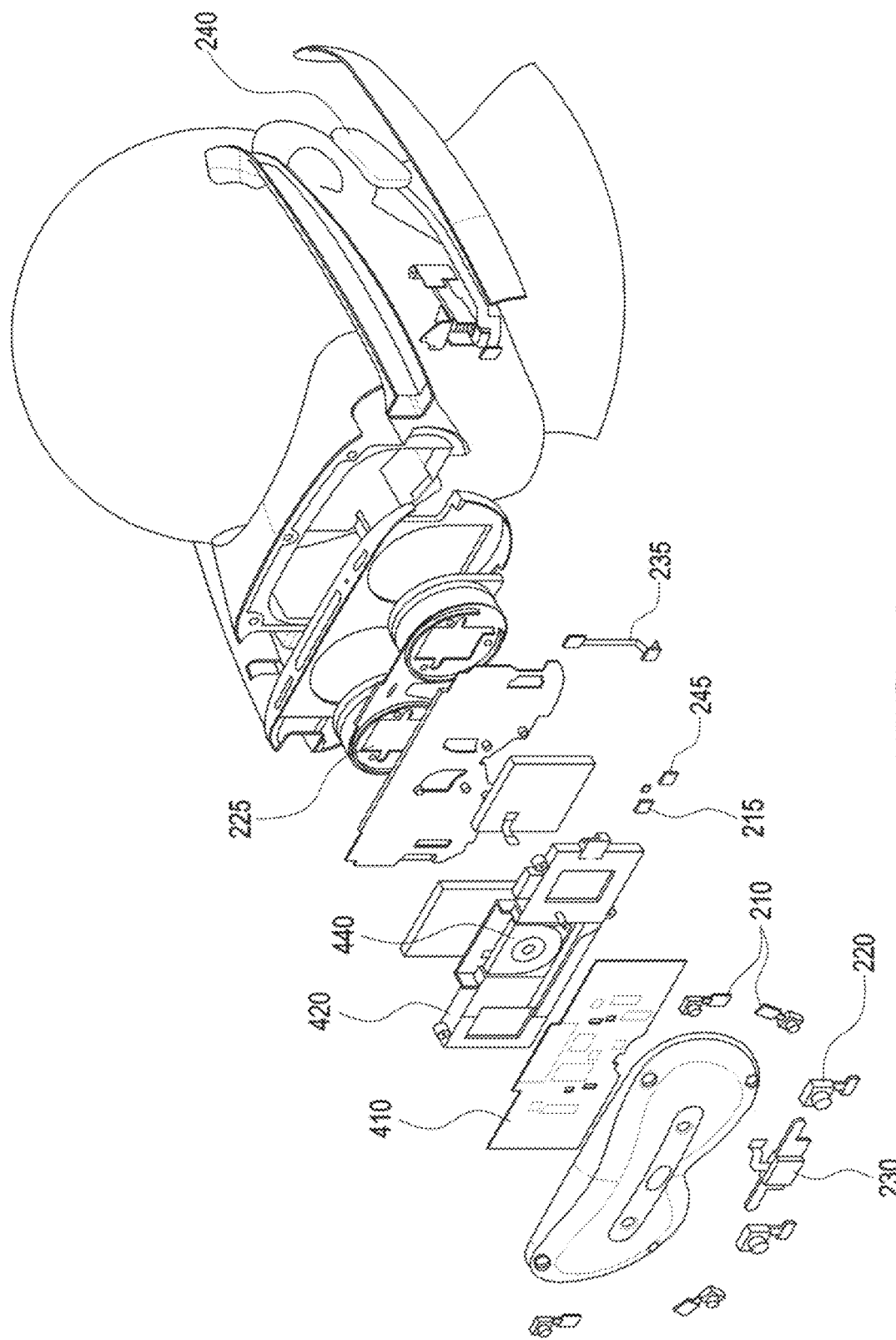
FIG. 4 is an exploded perspective view illustrating a head-mounted device according to one or more embodiments of the disclosure.
Figure 5A:
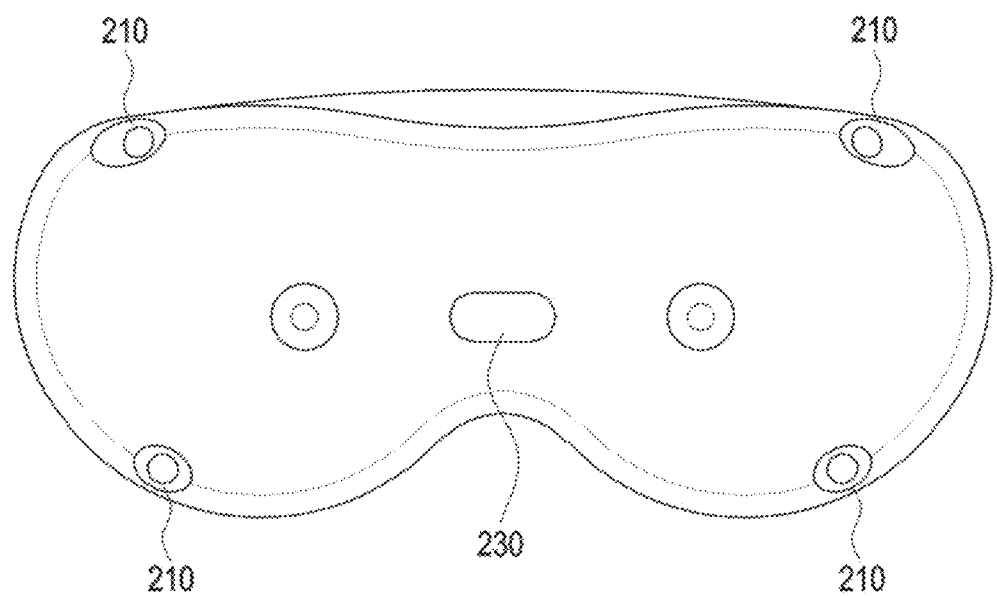
FIG. 5A is a front view illustrating a head-mounted device according to one or more embodiments of the disclosure.
Figure 5B:
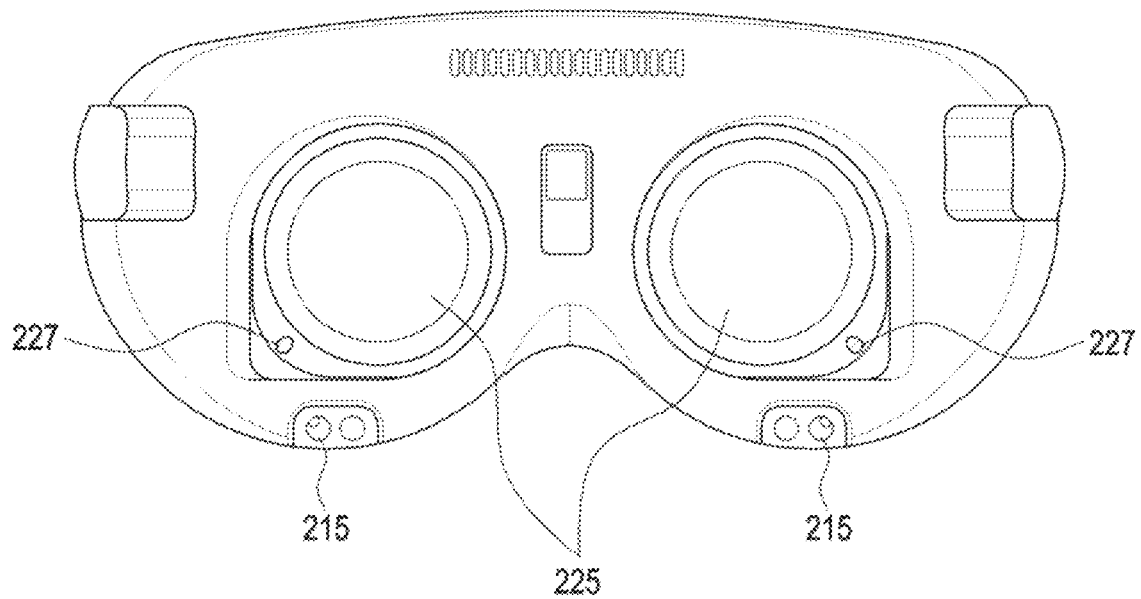
FIG. 5B is a rear view illustrating a head-mounted device according to one or more embodiments of the disclosure.

FIG. 2 is a front perspective view illustrating a head-mounted device 200 according to one or more embodiments of the disclosure. FIG. 3 is a rear perspective view illustrating a head-mounted device 200 according to one or more embodiments of the disclosure. FIG. 4 is an exploded perspective view illustrating a head-mounted device 200 according to one or more embodiments of the disclosure. FIG. 5A is a front view illustrating a head-mounted device 200 according to one or more embodiments of the disclosure. FIG. 5B is a rear view illustrating a head-mounted device 200 according to one or more embodiments of the disclosure.

Referring to FIGS. 2, 4, 5A, and 5B, a head-mounted device 200 (e.g., the electronic device 101 of FIG. 1) according to one or more embodiments may include a HeT camera 210, a face tracking camera 215, a VST camera 220, a display member 225, a gaze tracking camera 227, a depth sensor 230, a speaker 240, and/or a microphone 245. The head-mounted device 200 according to one or more embodiments may further include a face cover for enhancing wearability, foam cushioning for protecting the head, and/or temples for fixing the head-mounted device 200 to the head.

The HeT camera 210 according to one or more embodiments may be disposed to face forward of the head-mounted device 200 and may be disposed at each of a plurality of positions (e.g., four positions). In one or more embodiments, the HeT camera 210 may be used to detect and track the hand and to recognize the gesture (e.g., the hand gesture) of the wearer. The HeT camera 210 according to one or more embodiments may be used for 3 degrees of freedom (3DoF) or 6DoF head tracking, position (space, environment) recognition, and/or movement recognition to provide a mixed reality experience.

The face tracking camera 215 according to one or more embodiments may be used to recognize the face of the wearer, or may recognize and/or track both eyes of the wearer. In one or more embodiments, the face tracking camera 215 may detect a movement of the wearer's face.

The face tracking camera 215 according to one or more embodiments may be provided with an infrared LED 217 for a face tracking camera that irradiates infrared rays toward the face of the wearer.

The VST camera 220 according to one or more embodiments may capture an external image while the wearer is wearing the head-mounted device 200. In one or more embodiments, the VST camera 220 may obtain an image related to the ambient environment of the head-mounted device 200. In one or more embodiments, the image of the ambient environment captured through the VST camera 220 may be provided to implement mixed reality.

The VST camera 220 according to one or more embodiments may be disposed to face away from the display member 225 at a position corresponding to the display member 225 (e.g., a lens) below.

The display member 225 according to one or more embodiments may be configured to display an image and may include a lens for guiding an image generated by a light output module. In one or more embodiments, a Fresnel lens or a pancake lens may be used as the lens.

The display member 225 according to one or more embodiments may display an image corresponding to the mixed reality in front of the wearer's eyes. In one or more embodiments, the display member 225 may include at least one of a liquid crystal display (LCD), a digital mirror device (DMD), a liquid crystal on silicon (LCoS), a light emitting diode (LED) on silicon (LEDoS), an organic light emitting diode (OLED), or a micro light emitting diode (LED).

The display member 225 according to one or more embodiments of the disclosure may further include a vision correction lens configured to correct the eyesight of the wearer's eyes, and a vision adjustment wheel 223 configured to adjust the vision correction lens to correspond to the eyesight of the wearer.

The gaze tracking camera 227 according to one or more embodiments may detect the eyes of the wearer, and accordingly, the head-mounted device 200 may adjust a screen displayed through the display member 225 based on the detected eyes or gaze of the wearer. According to one or more embodiments, the gaze tracking camera 227 may track the wearer's gaze or recognize the iris included in the eye. In one or more embodiments, the gaze tracking camera 227 may further include an infrared (IR) light source.

The depth sensor 230 according to one or more embodiments may be configured to transmit a signal and receive a signal reflected from an object, and may be used for identifying a distance to the object, such as a time of flight (TOF) sensor. Alternatively or additionally, the depth sensor 230 may identify the distance between the camera modules and the object.

The proximity sensor 235 according to one or more embodiments may be configured to detect whether the wearer wears the head-mounted device. In one or more embodiments, the proximity sensor 235 may be disposed to face the wearer in proximity to the display member 225 disposed to correspond to the wearer's eyeball, and may detect whether the wearer's face is positioned in proximity.

The speaker 240 according to one or more embodiments may output a sound that the wearer may hear.

The microphone 245 according to one or more embodiments may receive the wearer's voice or the surrounding sound. In one or more embodiments, the head-mounted device 200 may record the sound received through the microphone 245.

The head-mounted device 200 according to one or more embodiments may include a power button 250 and a volume button 255 capable of receiving an input from the wearer. In one or more embodiments, the power button 250 may be configured to power on or off the head-mounted device 200 by a long press input. In one or more embodiments, the power button 250 may be configured to turn on or off the screen of the head-mounted device 200 by a short press input. In one or more embodiments, the power button 250 may be configured to recognize the fingerprint corresponding to the wearer's touching finger. In one or more embodiments, the volume button 255 may adjust the volume of the speaker 240 by a short press input.

In one or more embodiments, the head-mounted device 200 may perform a designated operation by a combination of inputs corresponding to the power button 250 and the volume button 255. For example, the head-mounted device 200 may perform rebooting based on an input of simultaneously pressing the power button 250 and the volume button 255 (e.g., a down button) for 7 seconds or more.

The head-mounted device 200 according to one or more embodiments may further include a circuit board 410 to which various components are connected, a battery bracket 420 for fixing the battery 430, and a battery 430 for charging and/or discharging power.

The head-mounted device 200 according to one or more embodiments may further include a vent 253 for discharging heat generated therein, an FAN 440 for circulating air to discharge heat through the vent, and/or a status indicator 257 for displaying the current status of the head-mounted device 200 through the output of light. The head-mounted device 200 according to one or more embodiments may further include a connection jack 260 connected to an external connector and/or a Pogo mounting recess 270 formed to contact a Pogo pin provided in the case device when the head-mounted device 200 is mounted on the case device.

As described above, the head-mounted device 200 according to one or more embodiments may have a form factor to be worn on the wearer's head. For example, the head-mounted device 200 may further include a strap and/or a wearing member to be fixed on the user's body part. In one or more embodiments, the head-mounted device 200 may provide a user experience based on augmented reality, virtual reality, and/or mixed reality while being worn on the wearer's head.

Figure 6A:
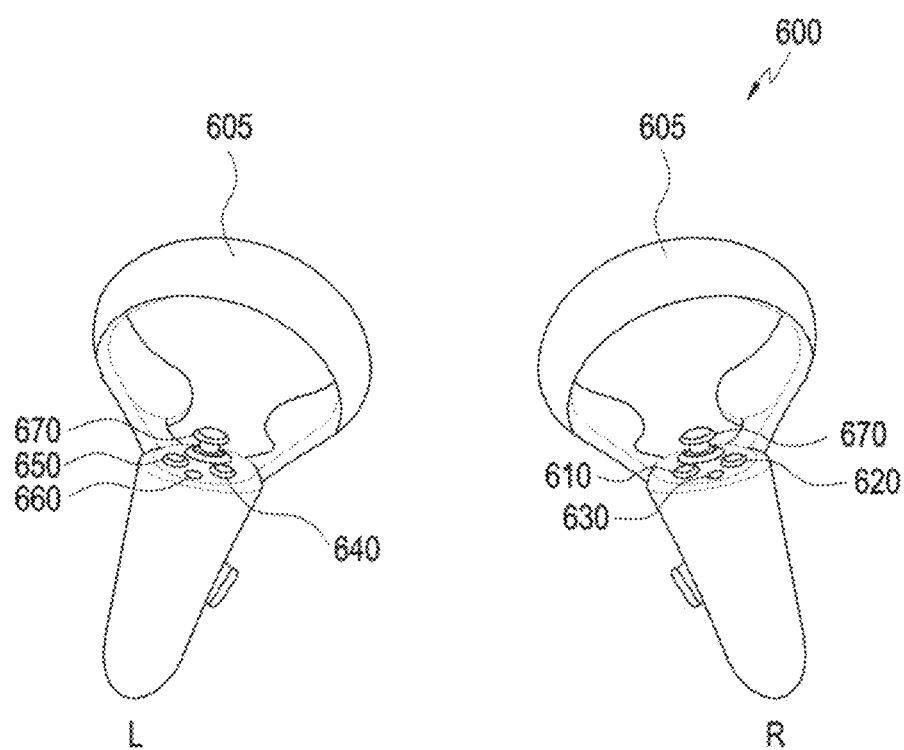
FIG. 6A is a front view illustrating a controller according to one or more embodiments of the disclosure.
Figure 6B:
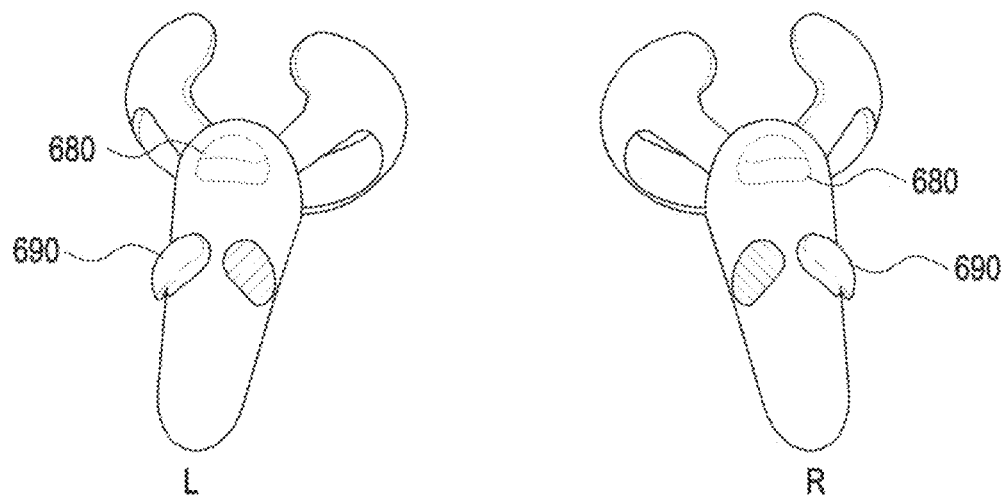
FIG. 6B is a rear view illustrating a controller according to one or more embodiments of the disclosure.

FIG. 6A is a front view illustrating a controller 600 according to one or more embodiments of the disclosure. FIG. 6B is a rear view illustrating a controller 600 according to one or more embodiments of the disclosure.

Referring to FIGS. 6A and 6B, a head-mounted device 200 according to one or more embodiments may be communicatively connected to a controller 600 and may receive an input from the wearer through the controller 600.

The controller 600 according to one or more embodiments may include at least one button 610, 620, 630, 640, 650, 660, 680, and 690, and may transmit a signal corresponding to a specific input to the head-mounted device 200 based on an input corresponding to at least one button 610, 620, 630, 640, 650, 660, 680, and 690.

At least one button 610, 620, 630, 640, 650, 660, 680, or 690 included in the controller 600 according to one or more embodiments may include an A button 610, a B button 620, a home button 630, an X button 640, a Y button 650, and a menu button 660. In one or more embodiments, an input corresponding to a specific operation may be designated for each button. In one or more embodiments, the controller 600 may further include a grab button 680 and/or a trigger button 690.

In one or more embodiments, the controller 600 may include a stick 670 configured to receive an operation input of the wearer. In one or more embodiments, the controller 600 may receive an operation input of the wearer for the stick 670 and transmit a signal corresponding thereto to the head-mounted device 200.

The controller 600 according to one or more embodiments may further include a status indicator 605 for outputting light in relation to a state of the controller 600 or a transmission/reception state of a signal corresponding to an input.

The controller 600 according to one or more embodiments may be gripped in the wearer's hand, may detect movement or rotation of the wearer's hand, and may transmit an input signal according to the detected movement or rotation to the head-mounted device 200.

FIGS. 6C, 6D, 6E, and 6F illustrate input methods of the head-mounted device 200 according to various embodiments of the disclosure. Referring to FIGS. 6C, 6D, 6E, and 6F, the head-mounted device 200 according to one or more embodiments may obtain an interaction input according to various input methods from the user U.

Figure 6C:
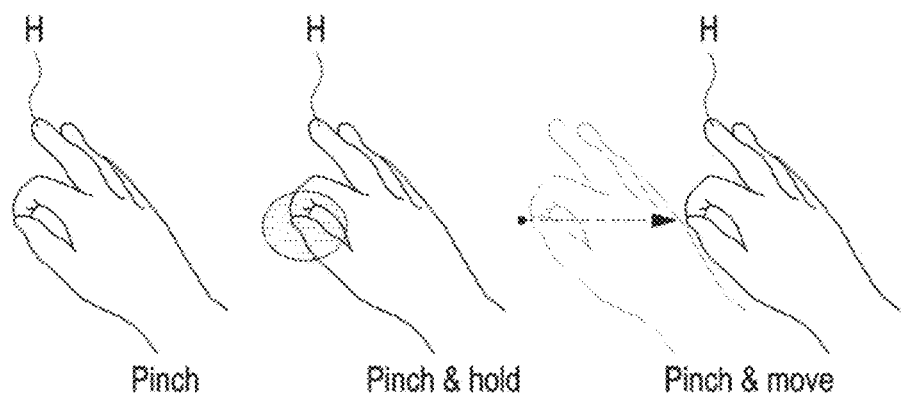
FIG. 6C shows an input method of a head-mounted device 200 according to various embodiments of the disclosure.

As illustrated in FIG. 6C, the head-mounted device 200 according to one or more embodiments may obtain a gesture input using the hand H of the user U. For example, the gesture input of the user U may include a pinch input, a pinch & hold input, and a pinch & move input. Further, the gesture input of the user U may include various inputs of a designated pattern.

Figure 6D:
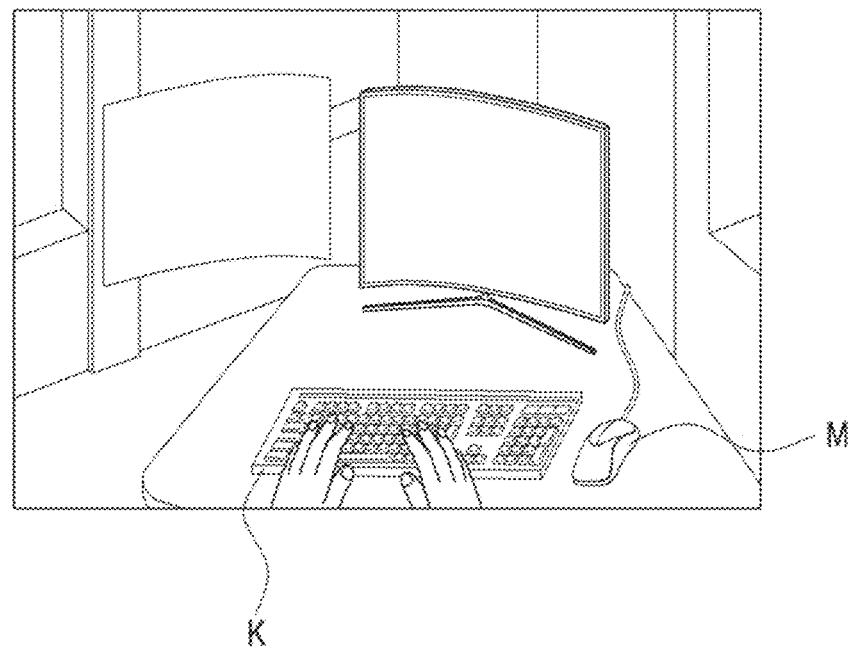
FIG. 6D shows an input method of a head-mounted device 200 according to various embodiments of the disclosure.

As illustrated in FIG. 6D, the head-mounted device 200 according to one or more embodiments may obtain an input through an input device such as a keyboard K or a mouse M. In one or more embodiments, the keyboard K or the mouse M may be a physical device, or may be a virtual keyboard or a virtual mouse virtually displayed on a display (e.g., the display member 225 of FIG. 3).

Figure 6E:
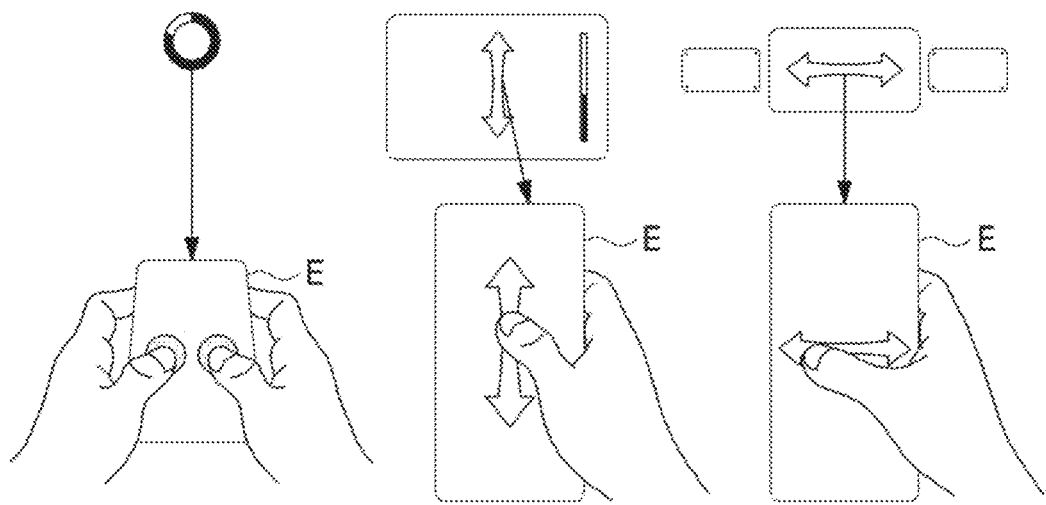
FIG. 6E shows an input method of a head-mounted device 200 according to various embodiments of the disclosure.
Figure 6F:
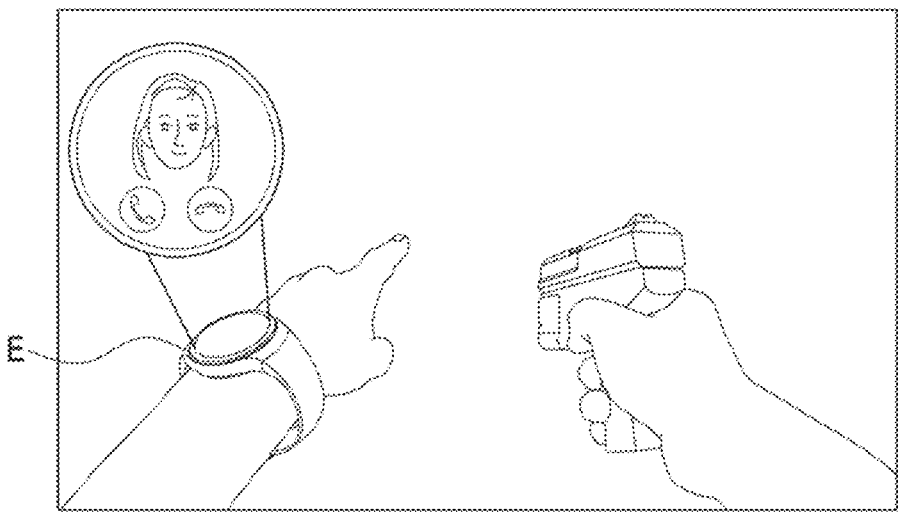
FIG. 6F shows an input method of a head-mounted device 200 according to various embodiments of the disclosure.

As illustrated in FIGS. 6E and 6F, the head-mounted device 200 according to one or more embodiments may obtain a touch input through an external device E. For example, the external device E may be a personal electronic device (e.g., a smartphone or a smart watch) including a touch panel. In one or more embodiments, the head-mounted device 200 may receive a touch input to a button displayed on the display of the external device E or a touch input of a designated pattern of the wearer corresponding to the touch panel from the external device E.

The head-mounted device 200 according to one or more embodiments may receive a voice input from the wearer through an artificial intelligence application (e.g., Bixby) capable of voice recognition.

Figure 7A:
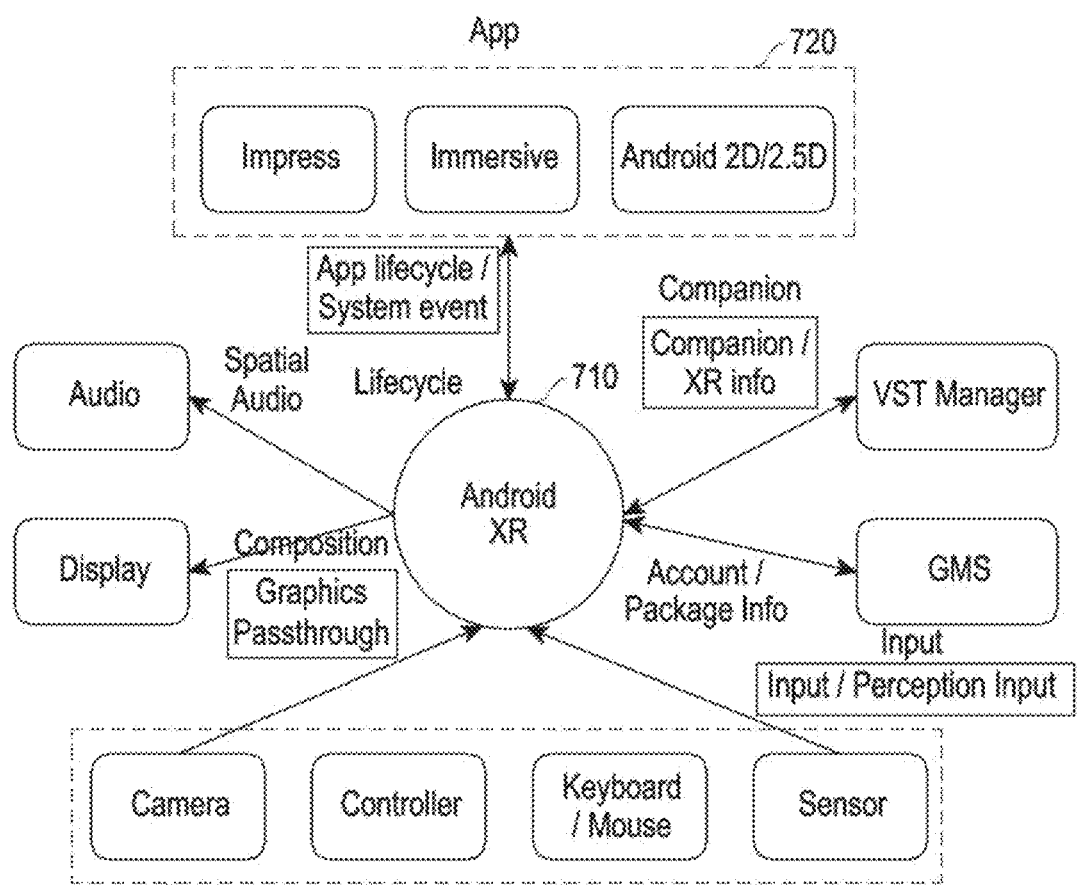
FIG. 7A illustrates a software architecture of a head-mounted device 200 according to one or more embodiments of the disclosure.
Figure 7B:
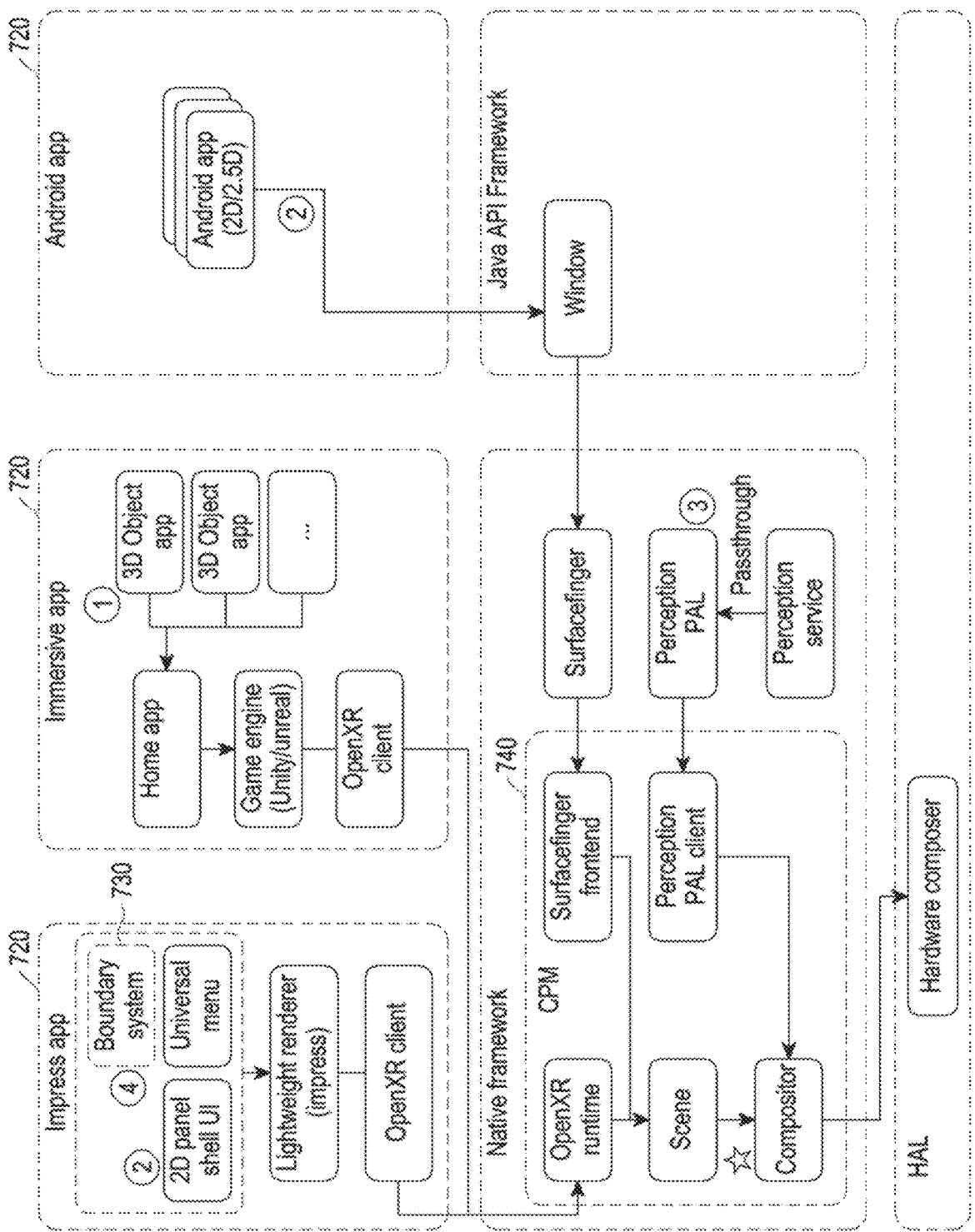
FIG. 7B illustrates a data flow for a composition operation according to one or more embodiments of the disclosure.
Figure 7C:
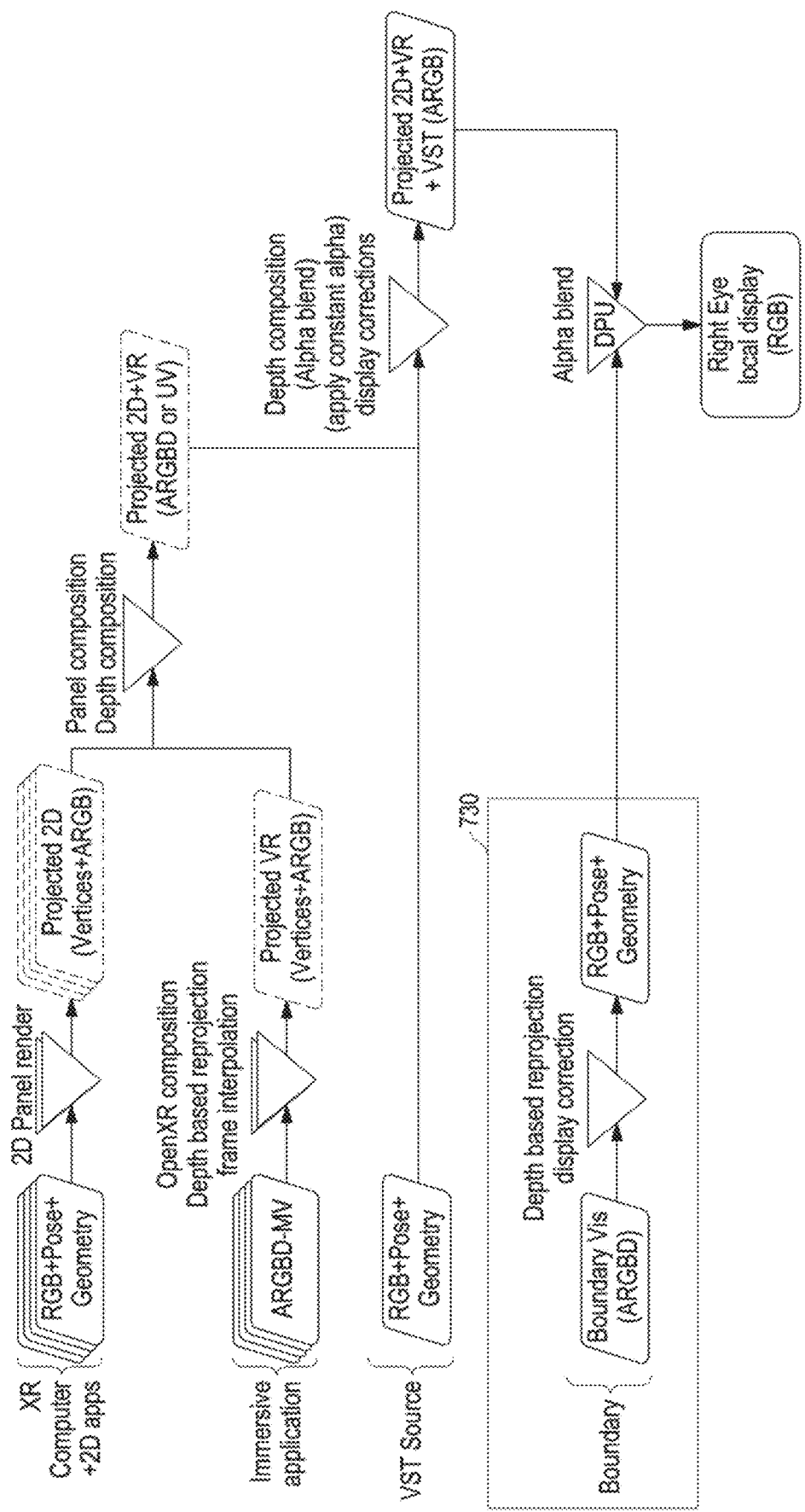
FIG. 7C illustrates a rendering flow of a display screen according to one or more embodiments of the disclosure.

FIG. 7A illustrates a software architecture of a head-mounted device 200 according to one or more embodiments of the disclosure. FIG. 7B illustrates a data flow for a composition operation according to one or more embodiments of the disclosure. FIG. 7C illustrates a rendering flow of a display screen according to one or more embodiments of the disclosure.

Figure 8:
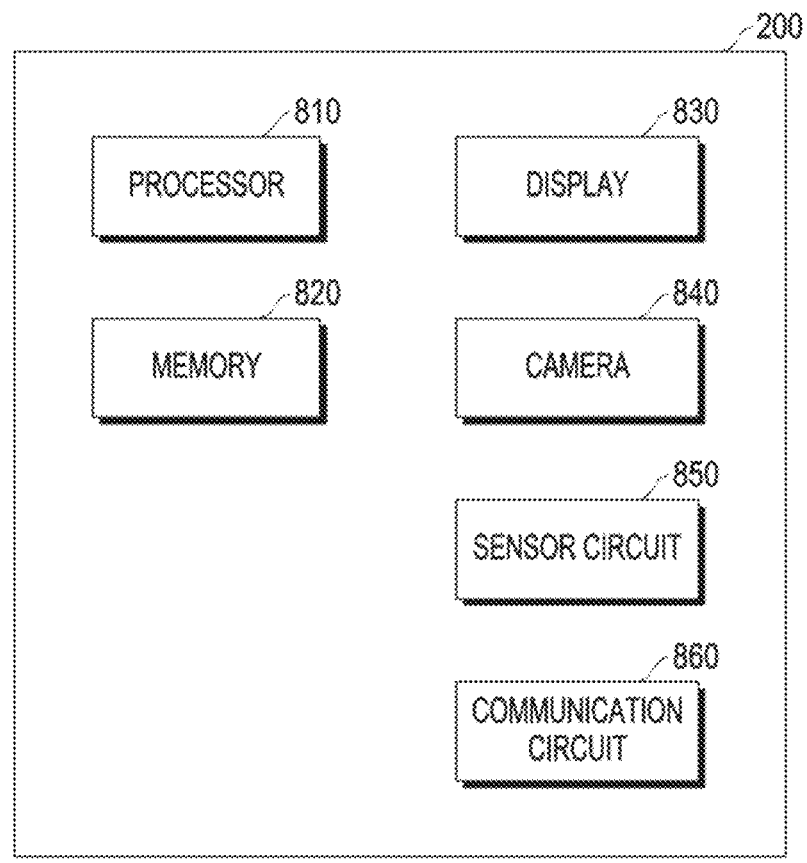
FIG. 8 is a block diagram illustrating a head-mounted device according to one or more embodiments of the disclosure.

Referring to FIGS. 7A, 7B, and 7C, the software architecture of the head-mounted device 200 according to one or more embodiments may be implemented by a processor (e.g., the processor 120 of FIG. 1 or the processor 810 of FIG. 8).

The OS 710 according to one or more embodiments may receive data or a signal from an input device (e.g., a camera, a controller 600, a keyboard/mouse, or a sensor) and output data or a signal to an output device (e.g., a speaker or a display). The OS 710 according to one or more embodiments may transmit/receive data or signals to/from a mixed reality system (e.g., a VST manager) or an account system (e.g., a global membership system (GMS)).

The OS 710 according to one or more embodiments may transmit/receive data or signals to/from the application library 720. The application library 720 according to one or more embodiments may include at least one library related to an application, and may include an application (Android 2D/2.5D) based on a 2D screen and/or an application (Impress or Immersive) based on a 3D screen.

The OS 710 according to one or more embodiments may display a screen on the display by the composition of an image (passthrough) captured using the camera and virtual reality graphics.

The composing presentation manager (CPM) 740 according to one or more embodiments may be configured in a native framework to generate a mixed reality screen obtained by synthesizing an image (passthrough) captured using a camera and virtual reality graphics.

The CPM 740 according to one or more embodiments may render a 3D display screen in a 3D coordinate space, based on layers in a defined z-order. The CPM 740 according to one or more embodiments may first synthesize a new pose value and a buffer and a geometry already possessed through second-half re-projection, and then may process an update (e.g., a new buffer or a new pose) in the XR application, and may process an update in the 2D panel. The CPM 740 according to one or more embodiments may organize a texture cache, an old item of a hash table, and a performance index record as the lowest priority.

In one or more embodiments, the CPM 740 may display a 3D window generated through the Java API framework on the screen, based on an application based on a 2D screen.

In one or more embodiments, the CPM 740 may display the 3D object rendered through the boundary system 730 on the screen, based on the application based on the 3D screen. In one or more embodiments, the boundary system 730 may display a 3D object on the screen based on a safety zone designated for each application and/or the boundary of the safety zone.

FIG. 8 is a block diagram illustrating a head-mounted device 200 according to one or more embodiments of the disclosure.

Referring to FIG. 8, a head-mounted device 200 according to one or more embodiments may include a processor 810, memory 820, a display 830, a camera 840, a sensor circuit 850, and/or a communication circuit (communication interface) 860.

The processor 810 (e.g., the processor 120 of FIG. 1) according to one or more embodiments may control at least one other component (e.g., a hardware or software component) of the head-mounted device 200. In one or more embodiments, the processor 810 may perform various data processing or operations, and as at least part of the data processing or operations, the processor 810 may store a command or data received from another component in the memory 820, may process the command or data stored in the memory 820, and may store result data in the memory 820.

The memory 820 (e.g., the memory 130 of FIG. 1) according to one or more embodiments may store instructions executable by the processor 810.

In one or more embodiments, the display 830 (e.g., the display module 160 of FIG. 1 or the display member 225 of FIG. 3) may be configured to display a screen in front of the wearer's eyeball. The display 830 according to one or more embodiments may display a screen corresponding to virtual reality or mixed reality. In one or more embodiments, the display 830 may display a 3D screen rendered in three dimensions.

The camera 840 (e.g., the camera module 180 of FIG. 1, the HeT camera 210 or the VST camera 220 of FIG. 2) according to one or more embodiments may be configured to obtain an image of an ambient environment. In one or more embodiments, a plurality of cameras 840 may be provided, and each of the cameras 840 may be disposed at a position adjacent to or corresponding to the wearer's eyeball. In one or more embodiments, the camera 840 may be disposed to face in a direction including the field of view (FoV) of the wearer to obtain an image of an ambient environment corresponding to the wearer's gaze.

In one or more embodiments, the head-mounted device 200 may further include a separate camera device (e.g., the face tracking camera 215 or the gaze tracking camera 227 of FIG. 3) that tracks the wearer's eyeball, identifies the wearer's gesture, or recognizes the wearer's face.

The sensor circuit 850 (e.g., the sensor module 176 of FIG. 1) according to one or more embodiments may be configured to obtain at least one value related to the ambient environment or the state of the user U. In one or more embodiments, the sensor circuit 850 may include at least one of an inertial sensor, an acceleration sensor, or a gyro sensor that detects movement or rotation of the wearer. In one or more embodiments, the sensor circuit 850 may include a camera sensor (e.g., the face tracking camera 215 or the gaze tracking camera 227 of FIG. 3) for detecting and/or tracking the position of the wearer's eyeball or gaze direction, or a vision sensor or a depth sensor (e.g., the depth sensor 230 of FIG. 2) for obtaining at least one value related to an external environment.

In one or more embodiments, the sensor circuit 850 may obtain posture information about the wearer. For example, the sensor circuit 850 may identify whether the wearer is in a sitting posture or a standing posture, or may identify a moving posture of the wearer. The head-mounted device 200 according to one or more embodiments may provide a guide regarding the posture of the user U based on the posture of the wearer identified through the sensor circuit 850.

The communication circuit 860 (e.g., the communication module 190 of FIG. 1) according to one or more embodiments may be configured to transmit/receive data (or signals) to/from an external device (e.g., the external device E of FIGS. 6E and 6F). In one or more embodiments, the communication circuit 860 may be communicatively connected to the external device E through a designated communication scheme. In one or more embodiments, the communication circuit 860 may transmit or receive data related to the ambient environment or the state of the user U from the external device E connected for communication. According to one or more embodiments, the external device E may be worn by the wearer to obtain data related to the state of the wearer, or may obtain data related to the ambient environment of the wearer.

In addition to the illustrated and described components, the head-mounted device 200 according to one or more embodiments may further include or exclude some components included in the electronic device 101 of FIG. 1 or the head-mounted device 200 of FIGS. 2 to 3.

Figure 9A:
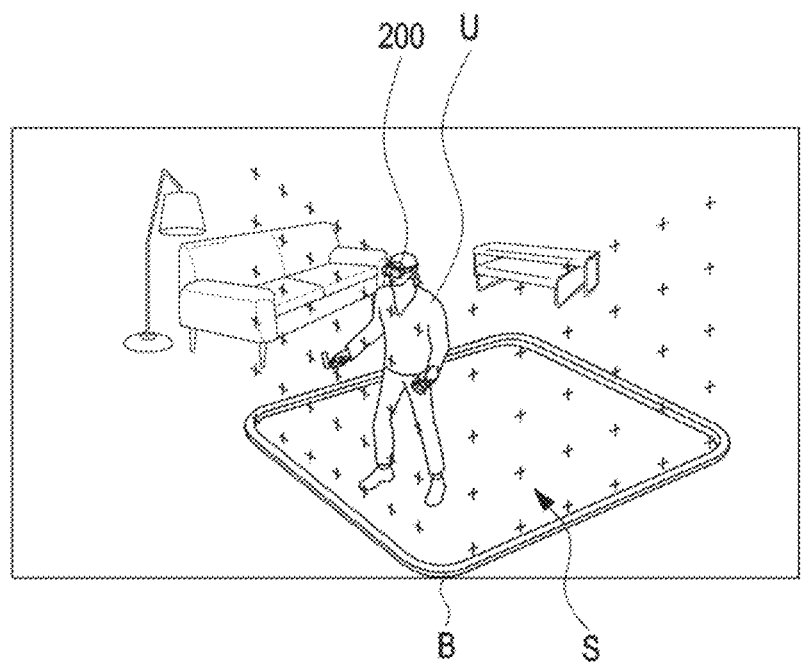
FIG. 9A shows a state of setting a room scale according to a comparative embodiment of the disclosure.
Figure 9B:
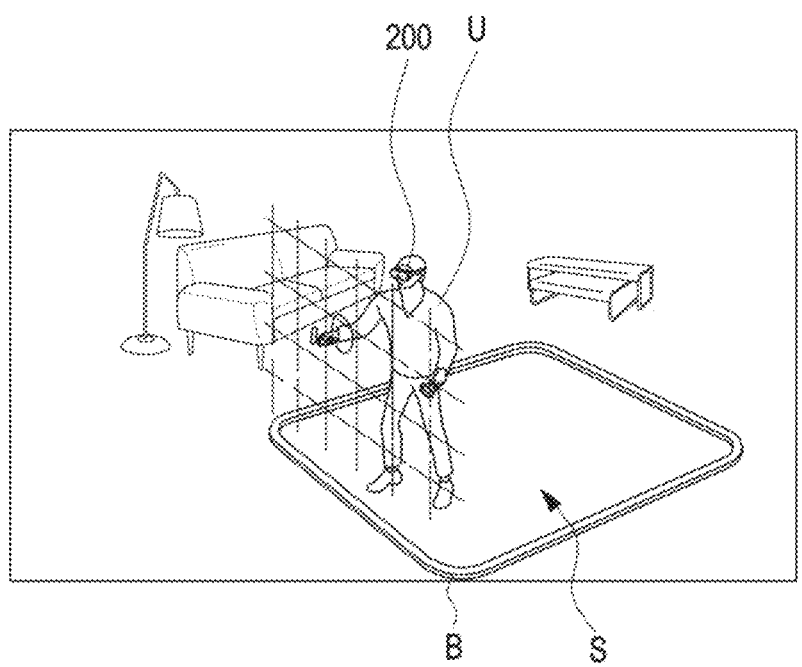
FIG. 9B shows a state of setting a room scale according to a comparative embodiment of the disclosure.
Figure 9C:
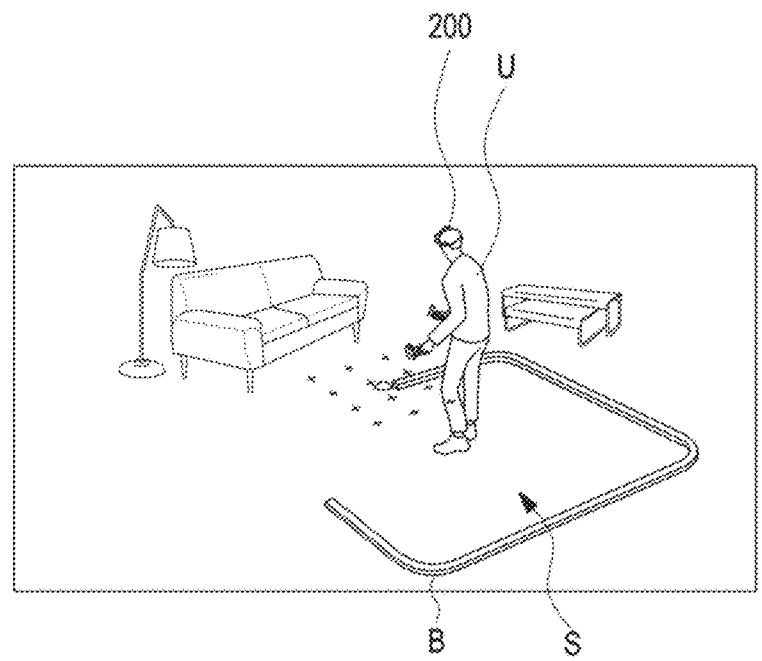
FIG. 9C shows a state of setting a room scale according to a comparative embodiment of the disclosure.

FIGS. 9A, 9B, and 9C are views illustrating a state of setting a room scale according to a comparative embodiment of the disclosure.

Referring to FIGS. 9A, 9B, and 9C, the head-mounted device 200 according to one or more embodiments may switch the operation mode between the fixed mode in which the boundary is fixed and the room scale mode in response to an executed application or content of the application. In one or more embodiments, the fixed mode may be an operation mode in which content is provided in a designated default safety protection boundary space (e.g., 1 [m]×1 [m]) with respect to the position of the user U while the position of the user U is fixed.

In one or more embodiments, the room scale may be a function of allocating a real space having a size corresponding to the virtual reality environment to the virtual reality. In one or more embodiments, the room scale mode may be an operation mode for providing content so that the user U is movable in the safety protection boundary space S (e.g., 2 [m]×2 [m] or more).

The head-mounted device 200 according to one or more embodiments may manually set the room scale space S. For example, the user may set the room scale boundary B while moving. In one or more embodiments, the size of the required room scale may vary in response to the executed application or content of the application, and the head-mounted device 200 may be required to manually set a room scale to change the room scale.

In one or more embodiments, when the head-mounted device 200 deviates from the set room scale, the head-mounted device 200 may reduce the immersion level of the user U due to a guardian operation of displaying the boundary B of the room scale.

Figure 10:
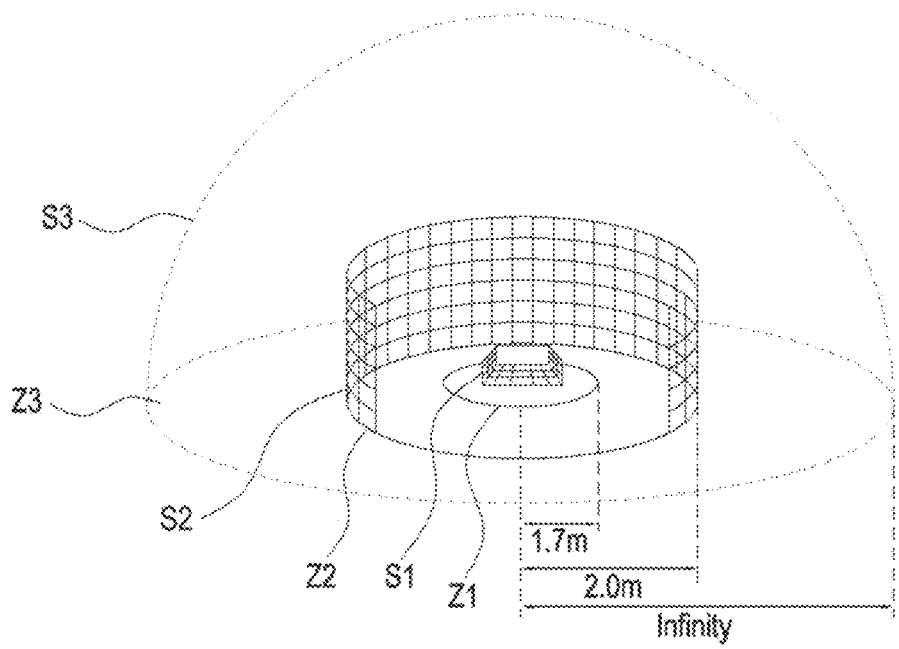
FIG. 10 illustrates various spaces and safety zones according to one or more embodiments of the disclosure.

FIG. 10 illustrates various spaces S1, S2, and S3 and safety zones Z1, Z2, and Z3 according to one or more embodiments of the disclosure.

Referring to FIG. 10, the head-mounted device 200 according to one or more embodiments may display screens corresponding to various spaces S1, S2, and S3. According to one or more embodiments, the head-mounted device 200 may display a screen corresponding to the executed application or content of the application in a designated space.

According to one or more embodiments, the required safety zone of the head-mounted device 200 may vary in response to the executed application or the content of the application.

In one or more embodiments, the head-mounted device 200 may include a first space S1 and a first safety zone Z1 corresponding to a near view. For example, the first safety zone Z1 may be a space having a radius of 1.7 [m] or less from the user U or the head-mounted device 200. For example, the first space S1 may be a space positioned at or inside the boundary of the first safety zone Z1. For example, the first space S1 may be a cylindrical curved surface or a flat surface extending in the vertical direction at the boundary or inside of the first safety zone Z1. For example, the head-mounted device 200 may display a screen of a near field of view such as a dash, a task bar, or a home menu in the first space S1.

In one or more embodiments, the head-mounted device 200 may include a second space S2 and a second safety zone Z2 corresponding to a middle view. For example, the second safety zone Z2 may be a space having a radius of 2.0 [m] or less from the user U or the head-mounted device 200.

For example, the second space S2 may be a space positioned at or inside the boundary of the second safety zone Z2. For example, the second space S2 may be a cylindrical curved surface extending in the vertical direction at or inside the boundary of the second safety zone Z2. For example, the head-mounted device 200 may display a wide field of view screen such as a game in the second space S2.

In one or more embodiments, the head-mounted device 200 may include a third space S3 and a third safety zone Z3 corresponding to a far view. For example, the third safety zone Z3 may be a space having an infinite radius from the user U or the head-mounted device 200. For example, the third space S3 may be a space positioned at or inside the boundary of the third safety zone Z3. For example, the head-mounted device 200 may display an infinite background screen in the third space S3.

The spaces and the safety zones have been described as merely an example, and various spaces and safety zones may be further set.

Figure 11A:
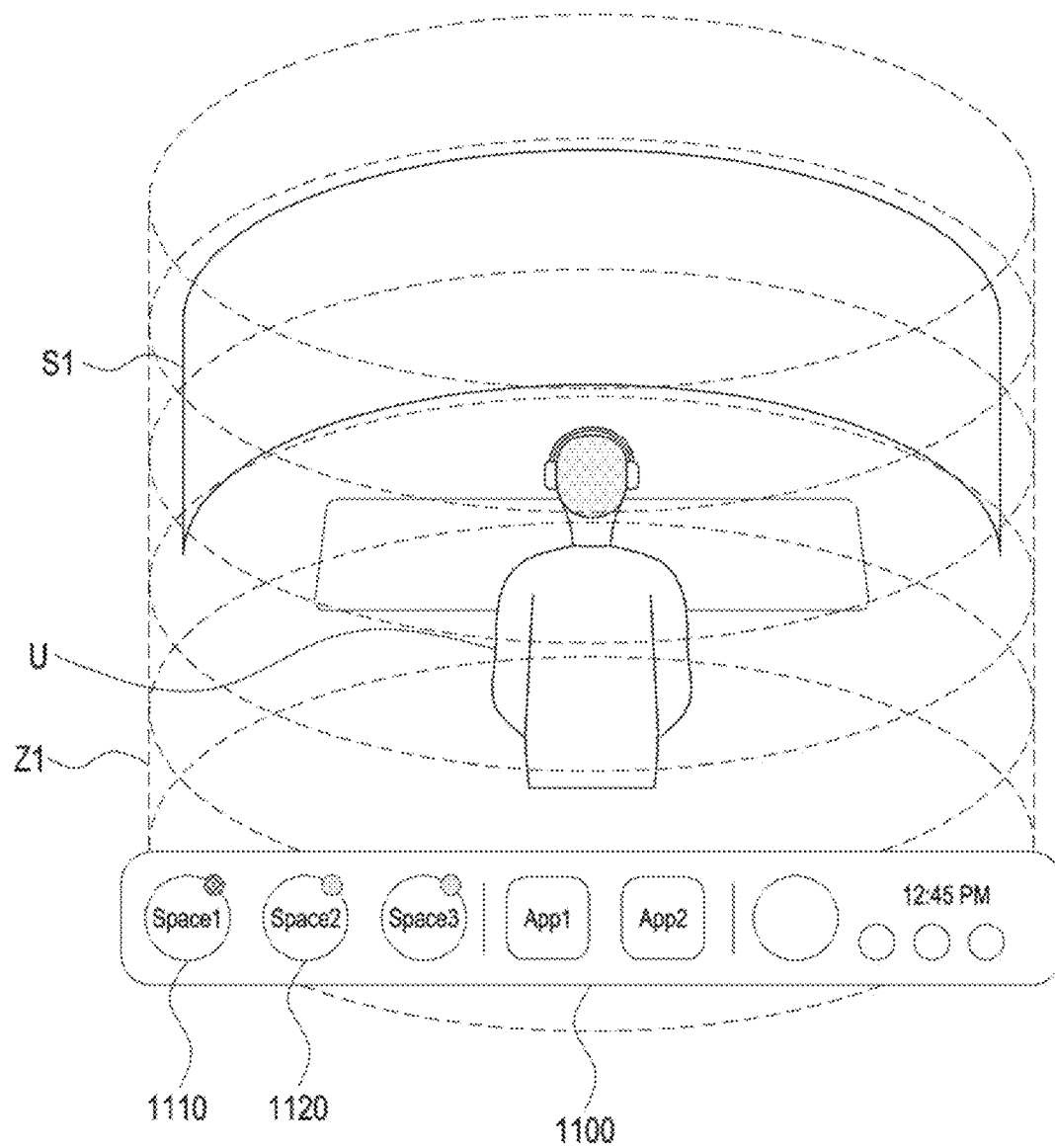
FIG. 11A shows a first space and a first safety zone according to one or more embodiments of the disclosure.
Figure 11B:
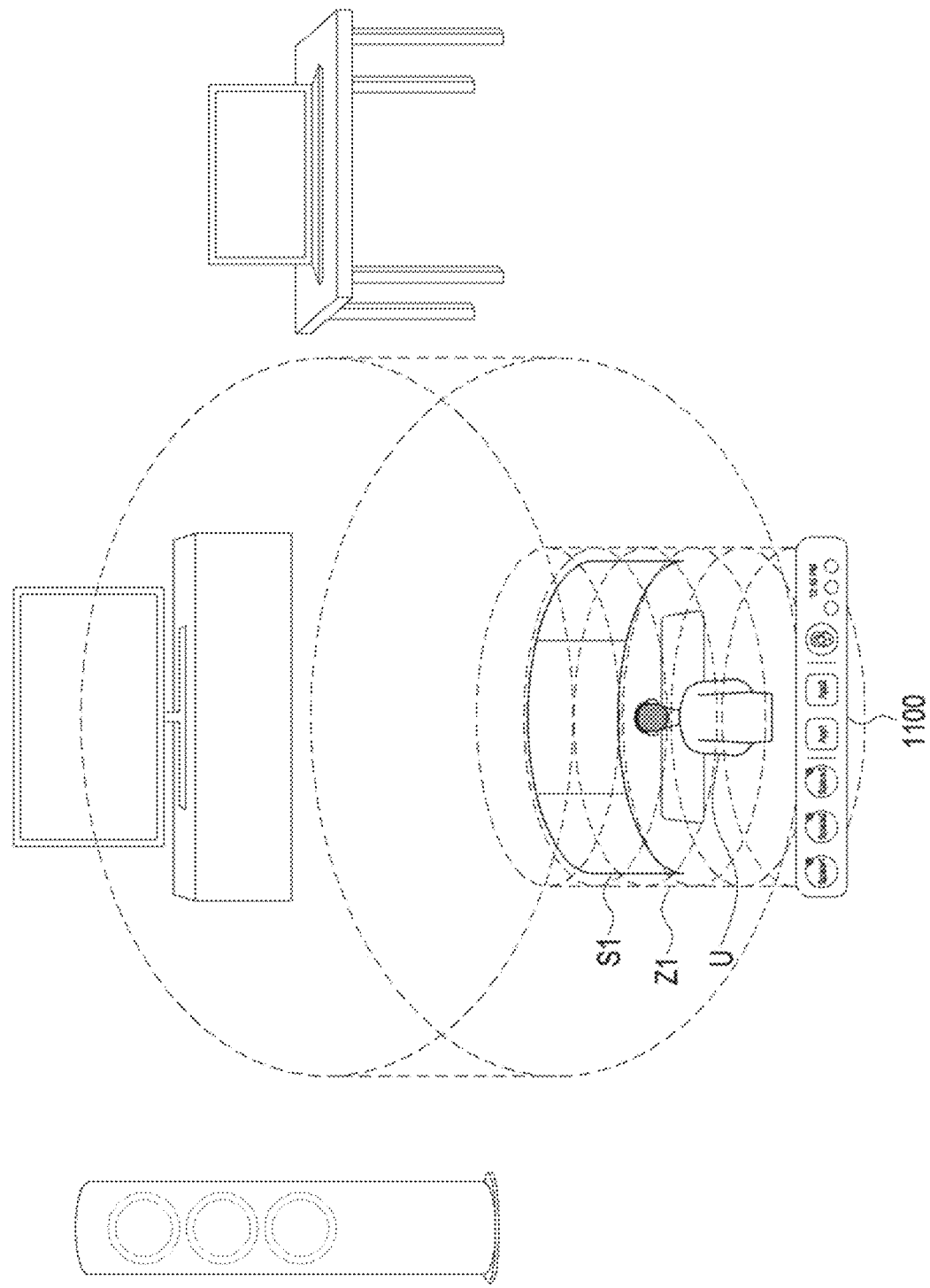
FIG. 11B shows a first space and a first safety zone according to one or more embodiments of the disclosure.
Figure 11C:
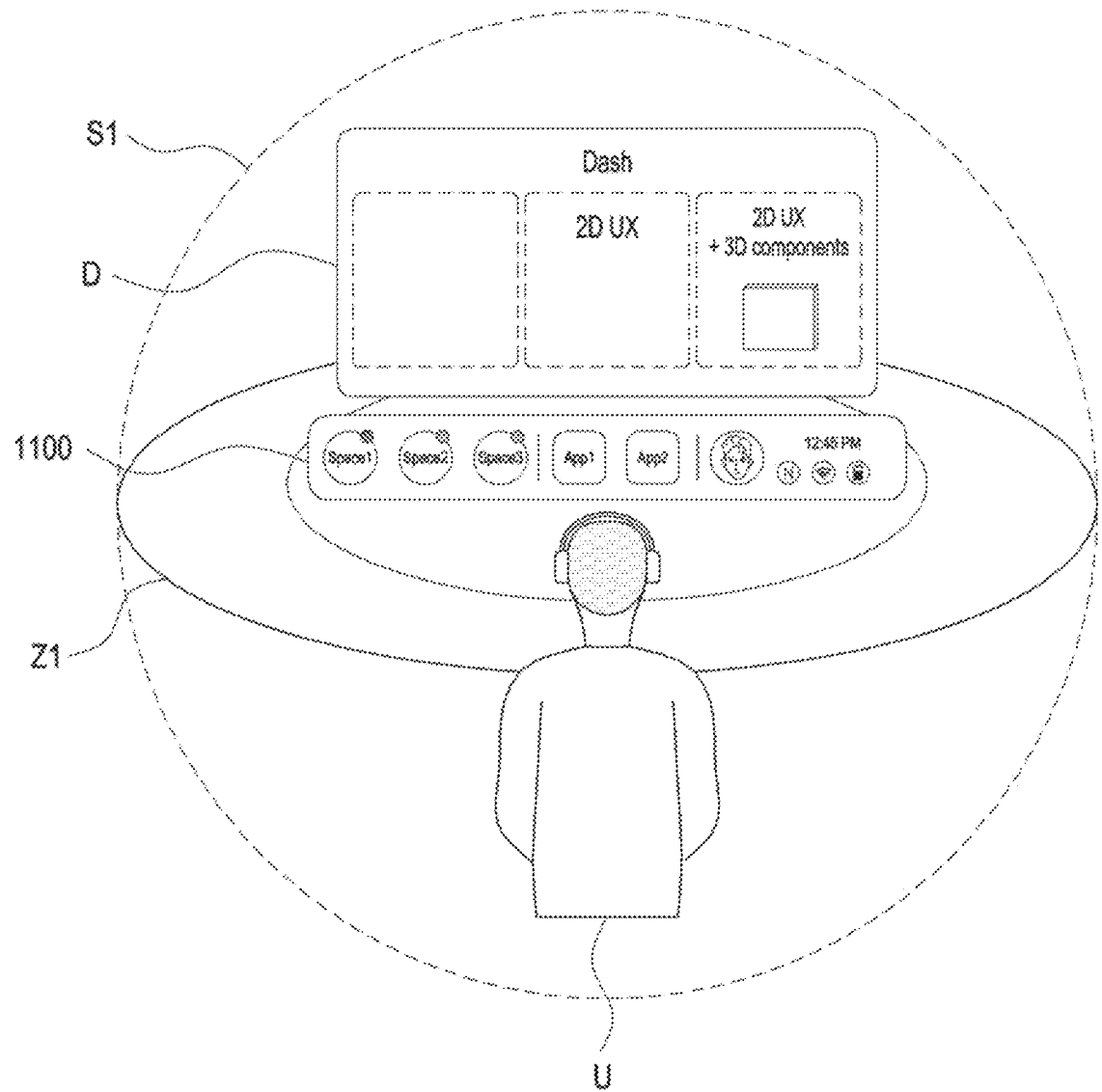
FIG. 11C shows a first space and a first safety zone according to one or more embodiments of the disclosure.

FIGS. 11A, 11B, and 11C illustrate a first space S1 and a first safety zone Z1 according to one or more embodiments of the disclosure.

Referring to FIGS. 11A, 11B, and 11C, the head-mounted device 200 according to one or more embodiments may provide content corresponding to the first space S1 through the display, based on the first safety zone Z1 corresponding to the first space S1.

The head-mounted device 200 according to one or more embodiments may automatically activate the first safety zone Z1 when booted or worn by the user U. According to one or more embodiments, the head-mounted device 200 may display a screen in the first space S1 and activate the first safety zone Z1 when initially accessing a designated user account. For example, the first safety zone Z1 and/or the first space S1 may correspond to the near-view area of the user U.

According to one or more embodiments, the head-mounted device 200 may activate the first space S1 and the first safety zone Z1 using the default configuration information. In one or more embodiments, the head-mounted device 200 may reset the activated space or safety zone based on the image or data obtained through the camera, the sensor circuit, and/or the communication circuit.

The head-mounted device 200 according to one or more embodiments may passively activate the first safety zone Z1 by an input of the user U.

The head-mounted device 200 according to one or more embodiments may activate the first safety zone Z1 corresponding to the first space S1, based on obtaining the request related to the content corresponding to the first space S1. According to one or more embodiments, when an application providing content corresponding to the first space S1 is executed, or when the executed application executes a task of providing the content corresponding to the first space S1, the first safety zone Z1 may be activated.

The head-mounted device 200 according to one or more embodiments may display a task bar 1100 for displaying (1110, 1120) the status related to the executed application or the space in the first space S1. In one or more embodiments, the head-mounted device 200 may display the task bar 1100 at a designated position and/or in a designated area of the first space S1. In one or more embodiments, the task bar may be automatically displayed in the first space S1 through the display, but may be hidden without being displayed by the input of the user U or by the displayed content.

In one or more embodiments, the head-mounted device 200 may display a dashboard D displaying a 2D object 3D object, a 2D window, and/or a 3D window in the first space S1. For example, the dashboard D may be a flat or curved screen displayed on at least a portion of the first space S1 in front of the user U wearing the head-mounted device 200.

In one or more embodiments, as illustrated in FIG. 11C, the head-mounted device 200 may display a home screen including the dashboard D and the task bar 1100 in the first space S1 through the display.

In one or more embodiments, the head-mounted device 200 may display a 3D screen corresponding to an immersive application in the first space S1, based on the first safety zone Z1.

The head-mounted device 200 according to one or more embodiments may obtain an image of an ambient environment, at least one value related to the ambient environment or the state of the user U, and/or data related to the ambient environment or the user U from a camera (e.g., the camera 840) configured to obtain the image of the ambient environment, a sensor circuit (e.g., the sensor circuit 850) configured to obtain at least one value related to the ambient environment or the state of the user U, and a communication circuit (e.g., the communication circuit 860 of FIG. 8)

configured to transmit/receive data related to the ambient environment or the state of the user U from an external device.

The head-mounted device 200 according to one or more embodiments may expand the first safety zone Z1 based on at least one of the image of the ambient environment, at least one value related to the ambient environment or the state of the user U, and/or data related to the ambient environment or the state of the user U.

The head-mounted device 200 according to one or more embodiments may update the first safety zone Z1 in real time to gradually expand the initially configured first safety zone Z1 while displaying a screen in the first space S1. In one or more embodiments, the head-mounted device 200 may store information corresponding to the updated first safety zone Z1. In one or more embodiments, the head-mounted device 200 may store information corresponding to the first safe zone Z1 updated corresponding to the logged-in account.

Figure 12:
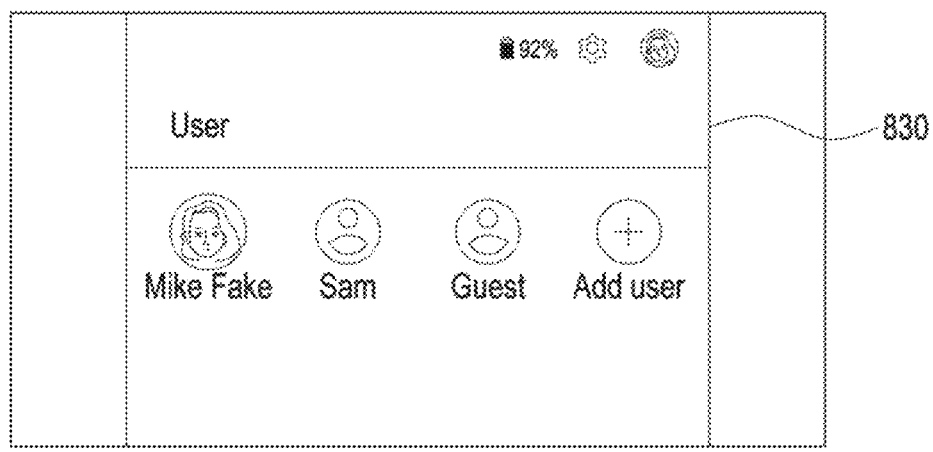
FIG. 12 illustrates at least one account registered in a head-mounted device according to one or more embodiments of the disclosure.

FIG. 12 illustrates at least one account registered in a head-mounted device 200 according to one or more embodiments of the disclosure.

Referring further to FIG. 12, the head-mounted device 200 according to one or more embodiments may register at least one account (e.g., Mike Fake, Sam, Guest) and display data related to the registered at least one account on the display 830. In one or more embodiments, the head-mounted device 200 may receive a selection of one of the registered accounts, log in to the account, and provide content corresponding to the logged-in account through the display 830.

The head-mounted device 200 according to one or more embodiments may activate a stored area corresponding to one of at least one registered account. According to one or more embodiments, the head-mounted device 200 may set the stored area corresponding to one of the registered accounts as the first safety zone Z1 and activate the set first safety zone Z1. In one or more embodiments, the head-mounted device 200 may display a screen corresponding to the content in the first space S1 corresponding to the activated first safety zone Z1.

The head-mounted device 200 according to one or more embodiments may set a lock for at least one registered account. In one or more embodiments, the head-mounted device 200 may use various methods such as password, biometric recognition, gesture, and head tracking as unlocking methods for the corresponding account.

The head-mounted device 200 according to one or more embodiments may display a designated lock screen on the display when receiving an input for changing the account or logging into the registered account. In one or more embodiments, the head-mounted device 200 may receive an interaction input (e.g., gesture or head tracking) of the user U while displaying the designated lock screen through the display.

Figure 13A:
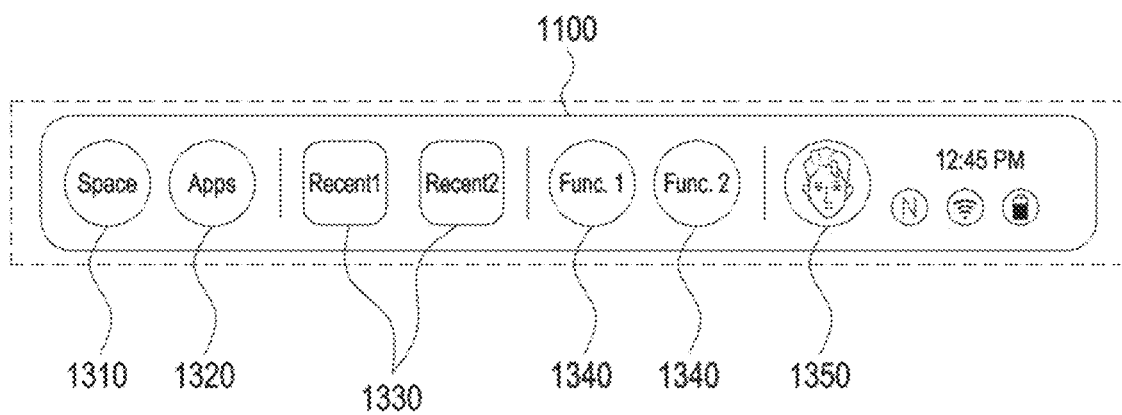
FIG. 13A shows an example task bar according to one or more embodiments of the disclosure.
Figure 13B:
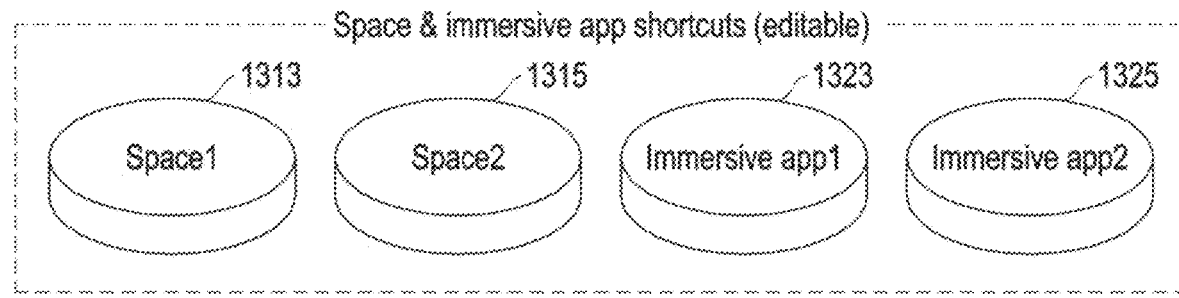
FIG. 13B shows an example task bar according to one or more embodiments of the disclosure.

FIGS. 13A and 13B illustrate an example task bar 1100 according to one or more embodiments of the disclosure.

Referring further to FIGS. 13A and 13B, the head-mounted device 200 according to one or more embodiments may display the task bar 1100 through the display 830. The task bar 1100 according to one or more embodiments may include a button 1310 related to a space, a button 1320 related to an executed application, a button 1330 related to a recently used application, a button 1340 related to a shortcut for at least one function, and/or a button 1350 related to a logged-in account.

Information about the status of the head-mounted device 200 may be further displayed on the task bar 1100 according to one or more embodiments. For example, the task bar 1100 may display the current time, the notification of the head-mounted device 200, the communication connection status of the head-mounted device 200, and/or the battery status of the head-mounted device 200.

In one or more embodiments, the task bar 1100 may include a button 1313 for displaying a space that is currently displayed or displayable on the display 830 and/or a button 1315 for displaying information related to a space that is displayable corresponding to the executed application or content.

In one or more embodiments, the task bar 1100 may include at least one button 1323 and 1325 related to the executed application. In one or more embodiments, the task bar 1100 may include at least one button 1330 related to a recently used application.

The head-mounted device 200 according to one or more embodiments may obtain a request related to the content corresponding to the second space S2 while providing the content corresponding to the first space S1 by activating the first safety zone Z1. For example, the second space S2 may be displayed at a relatively spaced position compared to the first space S1, and may require a relatively wide safety zone. For example, the content corresponding to the second space S2 may be a game screen according to a game application.

In one or more embodiments, when the head-mounted device 200 obtains the request related to the content corresponding to the second space S2, the head-mounted device 200 may identify whether the execution condition of the second space S2 is met (or, satisfied) based on the first safety zone Z1.

When the head-mounted device 200 according to one or more embodiments executes an application for providing content corresponding to the second space S2 or receives an input of providing content corresponding to the second space S2, the head-mounted device 200 may compare the second safety zone Z2 corresponding to the second space S2 with the currently activated first safety zone Z1.

In one or more embodiments, the head-mounted device 200 may identify whether the second safety zone Z2 corresponding to the second space S2 is included in the first safety zone Z1. In one or more embodiments, the head-mounted device 200 may identify whether the size of the second safety zone Z2 corresponding to the second space S2 is smaller than or equal to the size of the activated first safety zone Z1.

In one or more embodiments, when the second safety zone Z2 corresponding to the second space S2 is included in the first safety zone Z1, the head-mounted device 200 may display the content corresponding to the second space S2 in the second space S2 based on the first safety zone Z1.

In one or more embodiments, when the second safety zone Z2 corresponding to the second space S2 is not included in the first safety zone Z1, the head-mounted device 200 may display at least one affordance related to the second safety zone Z2 corresponding to the second space S2 through the display.

Figure 14:
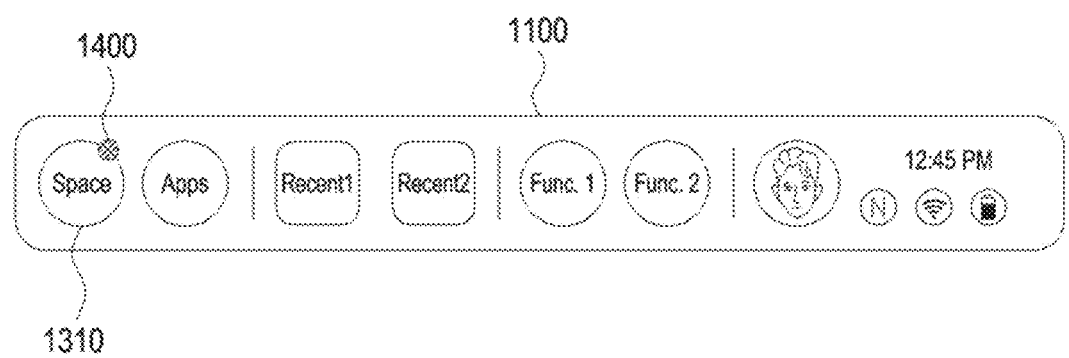
FIG. 14 illustrates an affordance displayed on a task bar of a display according to one or more embodiments of the disclosure.

FIG. 14 illustrates an affordance displayed on a task bar of a display according to one or more embodiments of the disclosure.

Referring to FIG. 14, the head-mounted device 200 according to one or more embodiments may display a task bar 1100 for displaying a state related to an executed application or space. In one or more embodiments, the head-mounted device 200 may display the task bar 1100 in the first space S1.

The head-mounted device 200 according to one or more embodiments may display an affordance 1400 indicating whether the execution condition of the second space S2 is met on the task bar 1100. In one or more embodiments, the head-mounted device 200 may display an affordance 1400 for displaying an inactive state on the space-related button 1310. For example, the head-mounted device 200 may display the space-related button 1310 in a gray color or may display a badge 1400 on the space-related button 1310 so that the user U may recognize that the space-related button 1310 is in an inactive state.

When there are the plurality of buttons respectively related to the plurality of spaces in the task bar 1100, the head-mounted device 200 according to one or more embodiments may display a badge indicating an active state on the button related to the space that may be displayed based on the activated safety zone, and may display a badge 1400 indicating an inactive state on the button 1310 related to the space that may not be displayed based on the activated safety zone.

Figure 15A:
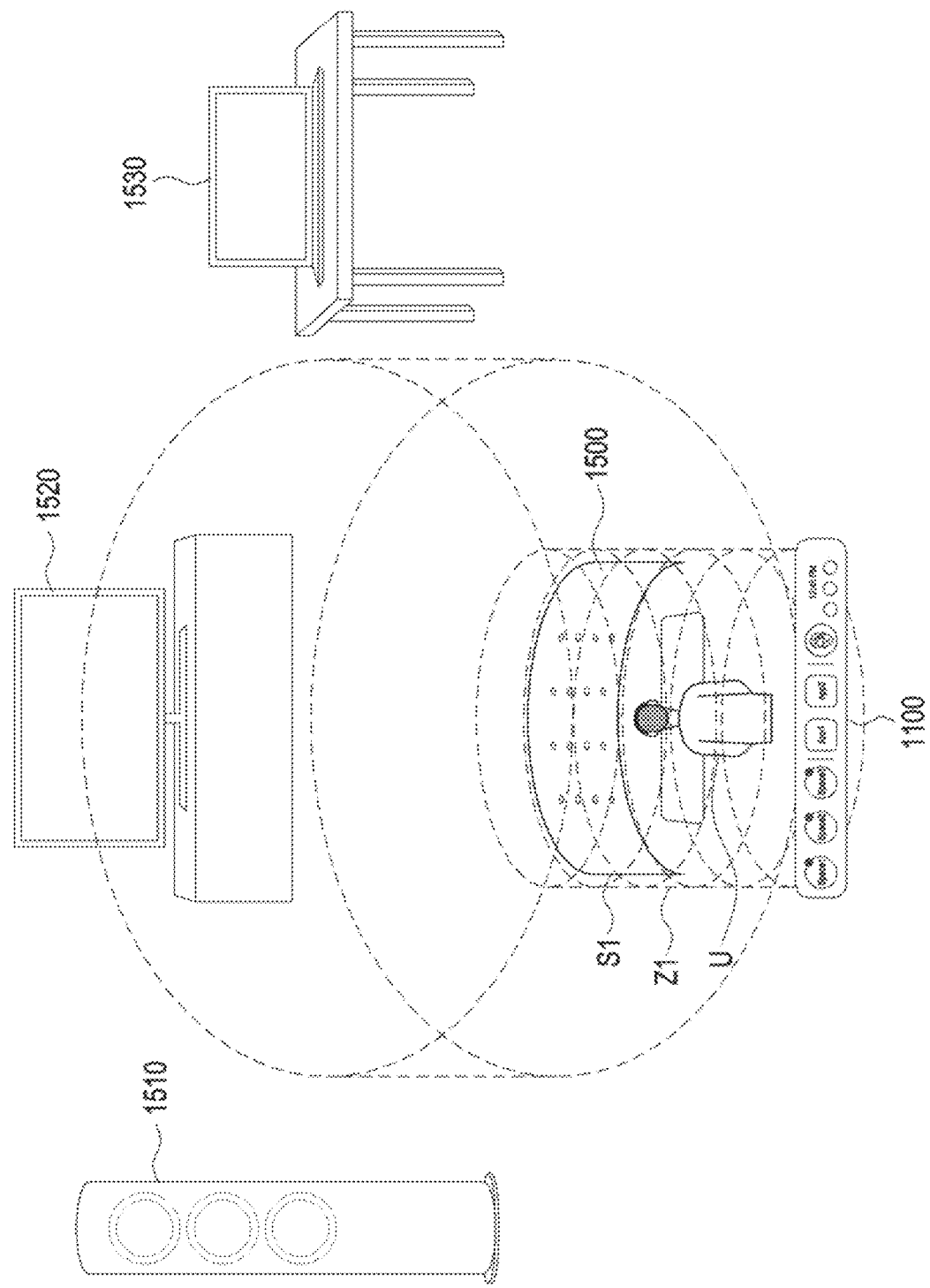
FIG. 15A illustrates a state of displaying a lock screen according to one or more embodiments of the disclosure.
Figure 15B:
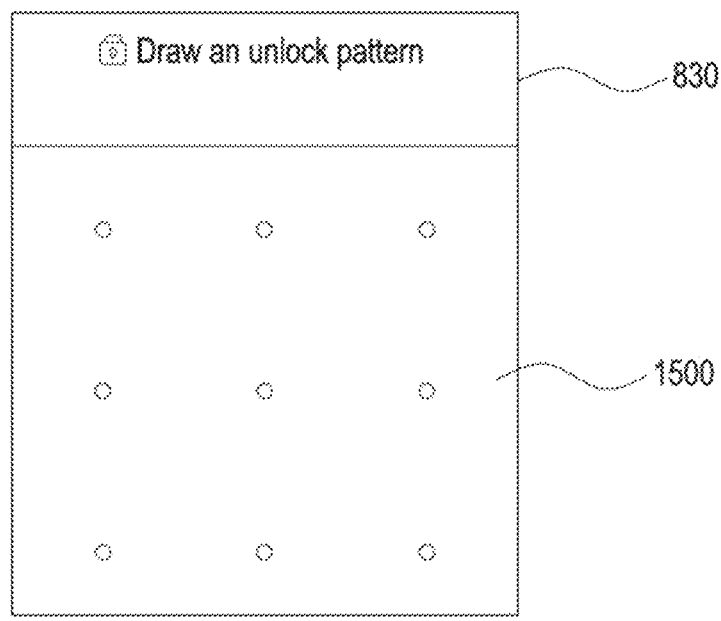
FIG. 15B illustrates an example lock screen according to one or more embodiments of the disclosure.
Figure 15C:
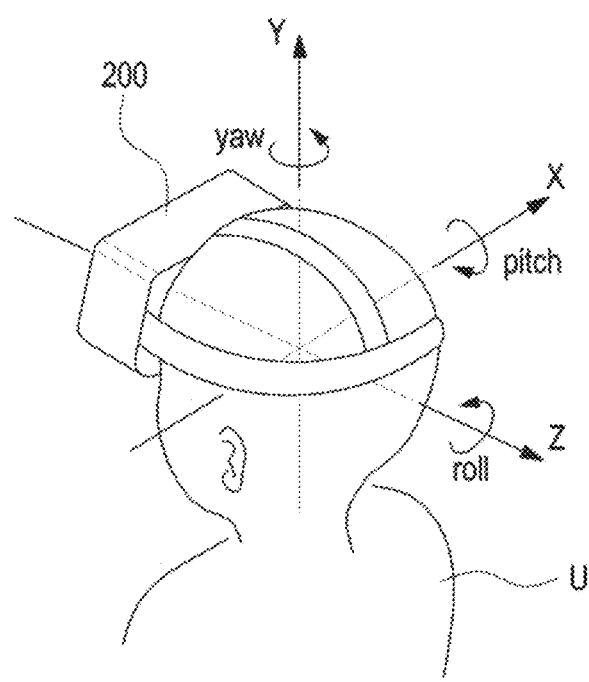
FIG. 15C illustrates movement and rotation of a head-mounted device according to one or more embodiments of the disclosure.

FIG. 15A illustrates a state of displaying a lock screen 1500 according to one or more embodiments of the disclosure. FIG. 15B illustrates an example lock screen 1500 according to one or more embodiments of the disclosure. FIG. 15C illustrates movement and rotation of a head-mounted device 200 according to one or more embodiments of the disclosure.

Referring to FIGS. 15A, 15B, and 15C, the head-mounted device 200 according to one or more embodiments may display a designated lock screen 1500 including at least one affordance on at least a portion of the display 830, based on the execution condition of the second space S2 being not met. In one or more embodiments, the head-mounted device 200 may display a spatial lock screen 1500 in the first space S1.

The head-mounted device 200 according to one or more embodiments may display a designated lock screen 1500 on the display 830 when an input for logging into a registered account or changing an account is received.

In one or more embodiments, the head-mounted device 200 may receive an interaction input (e.g., a gesture or head tracking) of the user U while displaying the designated lock screen 1500 through the display 830.

In one or more embodiments, the head-mounted device 200 may identify the input method of the user U. In one or more embodiments, the head-mounted device 200 may identify a method of an input corresponding to at least one affordance. For example, the input method may include an input using the controller 600, an input using a touch, an input using a voice, an input using a keyboard or a mouse, an input using a gesture, an input using an external device, and/or an input method using head tracking. In one or more embodiments, the head-mounted device 200 may display at least one affordance for leading to (or, guiding) an input according to the identified input method.

In one or more embodiments, the head-mounted device 200 may lead to a head tracking input of the user U corresponding to the designated lock screen 1500. In one or more embodiments, the head-mounted device 200 may lead the user U to move or rotate the head according to a designated pattern in response to an affordance included in the designated lock screen 1500. In one or more embodiments, the head-mounted device 200 may lead the user U to move the head in the x-axis, y-axis, or z-axis direction, or to rotate in the pitch, yaw, or roll direction.

According to one or more embodiments, the head-mounted device 200 may obtain an image of the ambient environment through the camera in response to the interaction input of the user U, and may activate the safety zone by identifying the area stored corresponding to the account as the safety zone based on the obtained image of the ambient environment.

In one or more embodiments, the head-mounted device 200 may identify whether the execution condition of the second space S2 is met, based on the input corresponding to the at least one affordance, and may release the display of the designated lock screen 1500, based on the execution condition of the second space S2 being met.

In one or more embodiments of the disclosure, when the ambient environment obtained through the camera is different from the safety zone stored corresponding to the user account, the head-mounted device 200 may provide an affordance for leading to resetting of the safety zone. Specifically, the head-mounted device 200 according to one or more embodiments may obtain an image of the ambient environment (e.g., an image including the air conditioner 1510, the TV 1520, and the PC 1530 of FIG. 15A) through the camera. The head-mounted device 200 may identify the safety zone based on the obtained image of the ambient environment. When the identified safety zone is different from the stored safety zone corresponding to the user's account, the head-mounted device 200 may provide at least one affordance for leading to a user input to reset to the identified safety zone, and reset and activate the safety zone based on the interaction input of the user U corresponding to the affordance.

Figure 16:
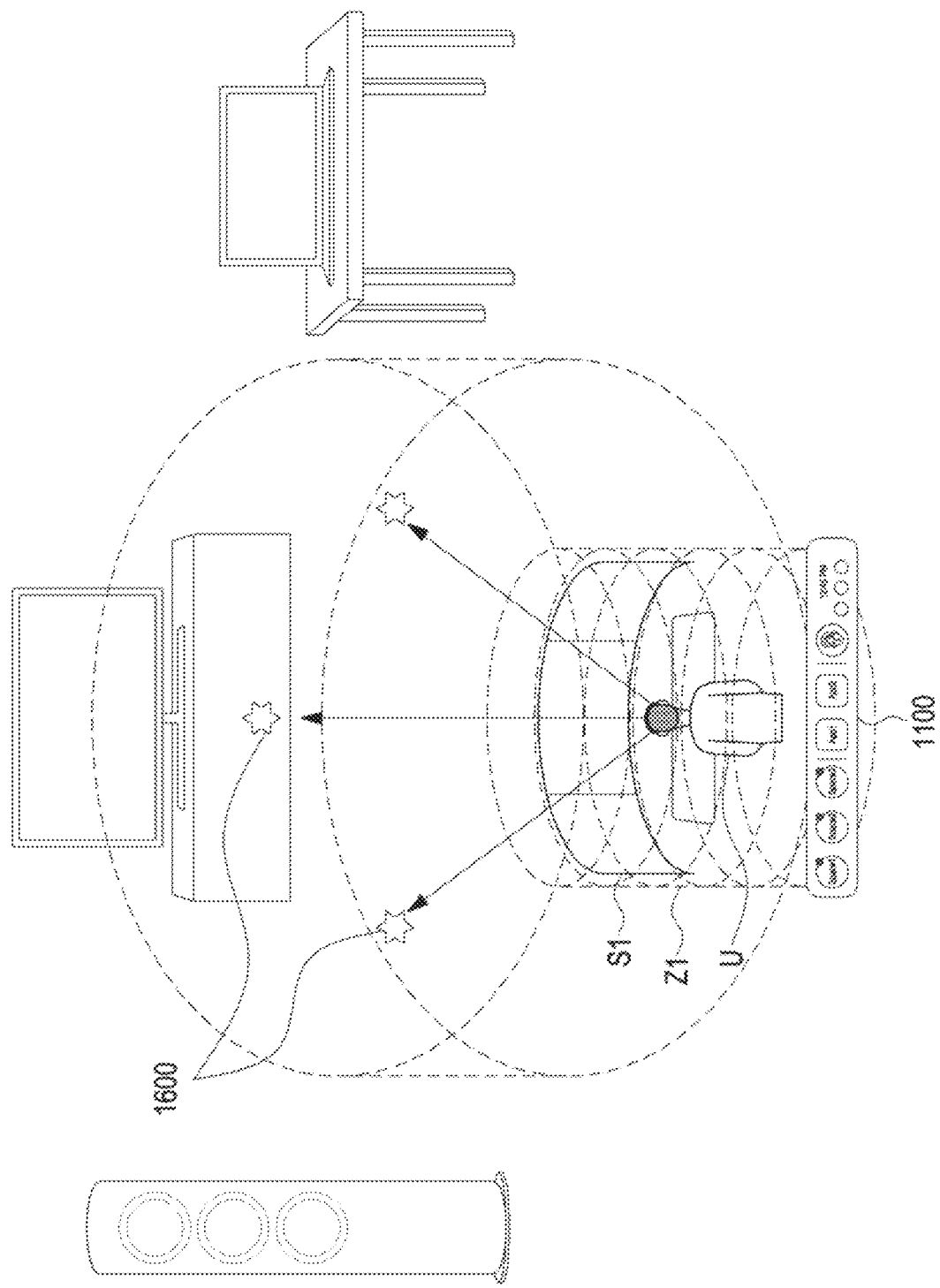
FIG. 16 shows an example affordance of leading to a wearer's gaze input according to one or more embodiments of the disclosure.
Figure 17:
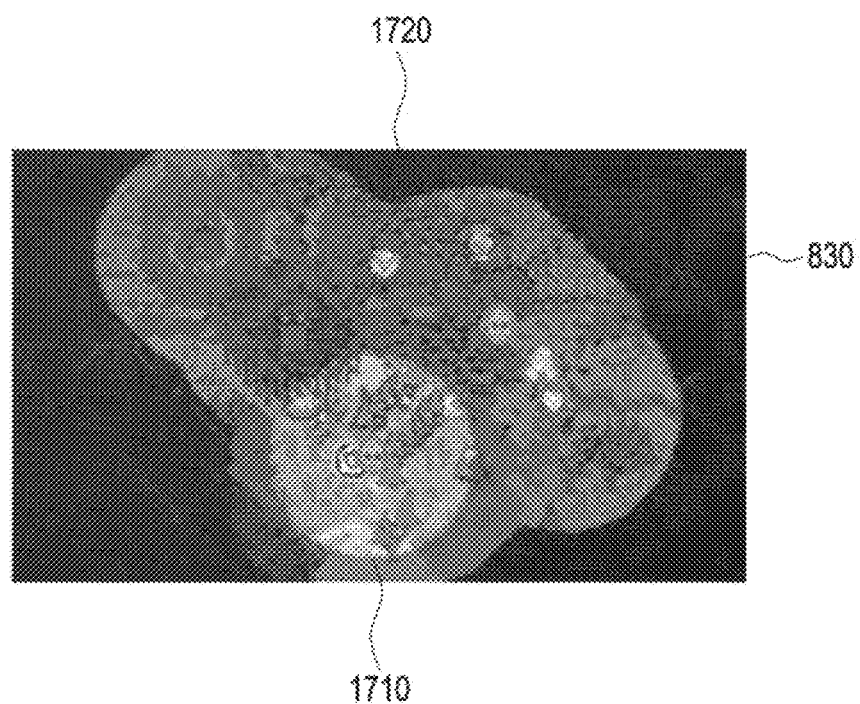
FIG. 17 shows an example affordance of leading to a wearer's gaze input according to one or more embodiments of the disclosure.

FIGS. 16 and 17 illustrate an example affordance of leading to a gaze input of a user U according to one or more embodiments of the disclosure.

Referring to FIGS. 16 and 17, the head-mounted device 200 according to one or more embodiments may display at least one affordance 1600, 1710, or 1720 on at least a portion of the display 830, based on the execution condition of the second space S2 being not met.

The head-mounted device 200 according to one or more embodiments may identify a method of an input corresponding to the at least one affordance 1600, 1710, or 1720, and may display the at least one affordance 1600, 1710, or 1720 for leading to an input corresponding to the identified method of the input.

In one or more embodiments, the head-mounted device 200 may display, through the display 830, at least one affordance 1600, 1710, or 1720 for leading to a gaze input of the user U.

In one or more embodiments, as illustrated in FIG. 16, the head-mounted device 200 may display an object corresponding to a falling meteor or an object 1600 corresponding to a constellation, as the affordance 1600, 1710, or 1720 for leading to the gaze of the user U.

In one or more embodiments, as illustrated in FIG. 17, the head-mounted device 200 may display a screen on the display 830 to distinguish an area 1720 that is not identified by the gaze input of the user U from the identified area 1710. According to one or more embodiments, the head-mounted device 200 may lead to a gaze input to the non-identified area 1720 in which the gaze input has not occurred.

In one or more embodiments, the head-mounted device 200 may darkly display the area 1720 not identified by the gaze input, and may relatively brightly display the area 1710 identified by the gaze input.

In one or more embodiments, the head-mounted device 200 may generate a difference in sharpness for each spaced distance. For example, a relatively close near-view area may be displayed relatively clearly, and a relatively distant far-view area may be displayed relatively darkly. Accordingly, the head-mounted device 200 may lead to a gaze input of the user U to the non-identified area 1720 and/or a relatively distant far-view area.

According to one or more embodiments, the head-mounted device 200 may obtain an image of an ambient environment or at least one value from a camera or a sensor circuit, based on a gaze input.

Figure 18A:
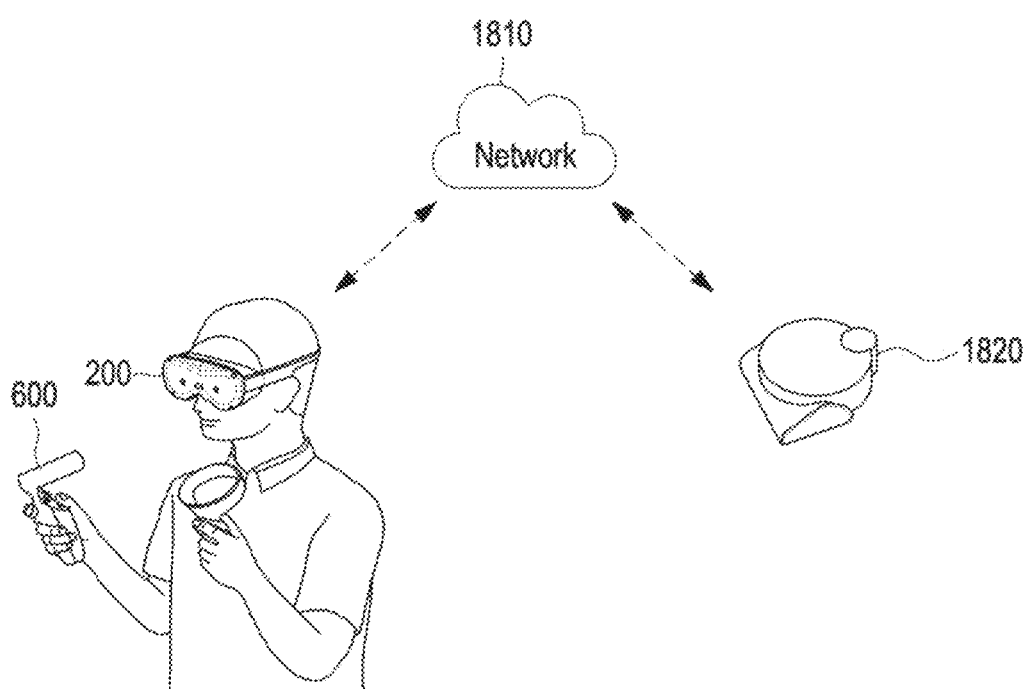
FIG. 18A is a view illustrating a configuration in which a head-mounted device receives data from an external device according to one or more embodiments of the disclosure.
Figure 18B:
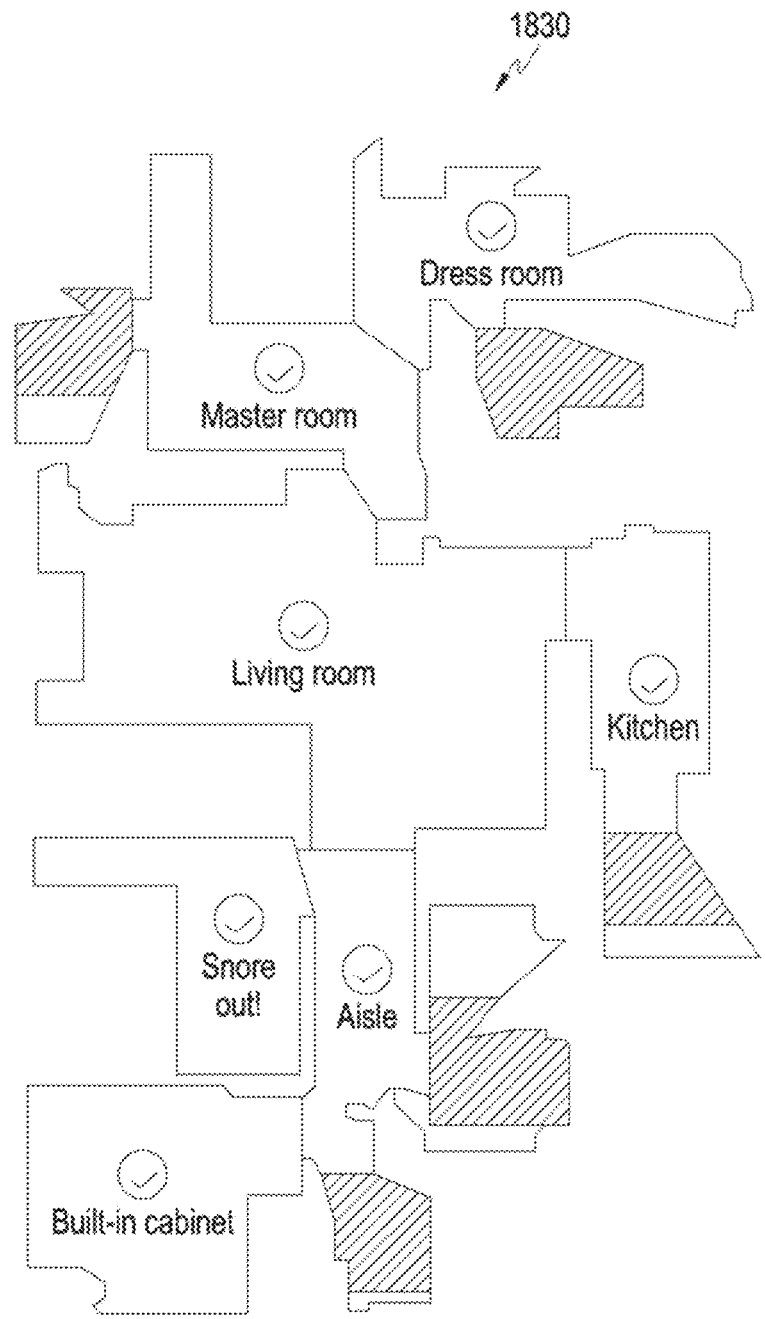
FIG. 18B illustrates example data received by a head-mounted device according to one or more embodiments of the disclosure.

FIG. 18A is a view illustrating a configuration in which a head-mounted device 200 receives data from an external device according to one or more embodiments of the disclosure. FIG. 18B illustrates example data received by a head-mounted device 200 according to one or more embodiments of the disclosure.

Referring to FIGS. 18A and 18B, the head-mounted device 200 according to one or more embodiments may receive data related to the ambient environment or the state of the user U from the external device 1820 through a communication circuit (e.g., the communication circuit 860 of FIG. 8). In one or more embodiments, the head-mounted device 200 may be directly communicatively connected to the external device 1820 to transmit/receive data to/from the external device 1820. According to one or more embodiments, the head-mounted device 200 may transmit/receive data to/from the external device 1820 through the network 1810.

In one or more embodiments, the external device 1820 may be a robot vacuum. In one or more embodiments, the robot vacuum 1820 may create an indoor map through a simultaneous localization and map-building (SLAM) function. The head-mounted device 200 according to one or more embodiments may receive data related to the indoor map 1830 from the robot vacuum 1820 through the communication circuit 860.

As illustrated in FIG. 18B, the data related to the indoor map 1830 received from the robot vacuum 1820 may include a space in which the user U wearing the head-mounted device 200 is movable.

The head-mounted device 200 according to one or more embodiments may set a safety zone or expand the activated safety zone, based on the received data related to the indoor map 1830.

The head-mounted device 200 according to one or more embodiments may receive data (e.g., a spaced relative distance) about the position of the external device from the external device 1820 communicatively connected via a directional communication scheme (e.g., ultra-wide band (UWB) communication). The head-mounted device 200 according to one or more embodiments may generate spatial map data, based on the received data about the position of the external device 1820.

Figure 20:
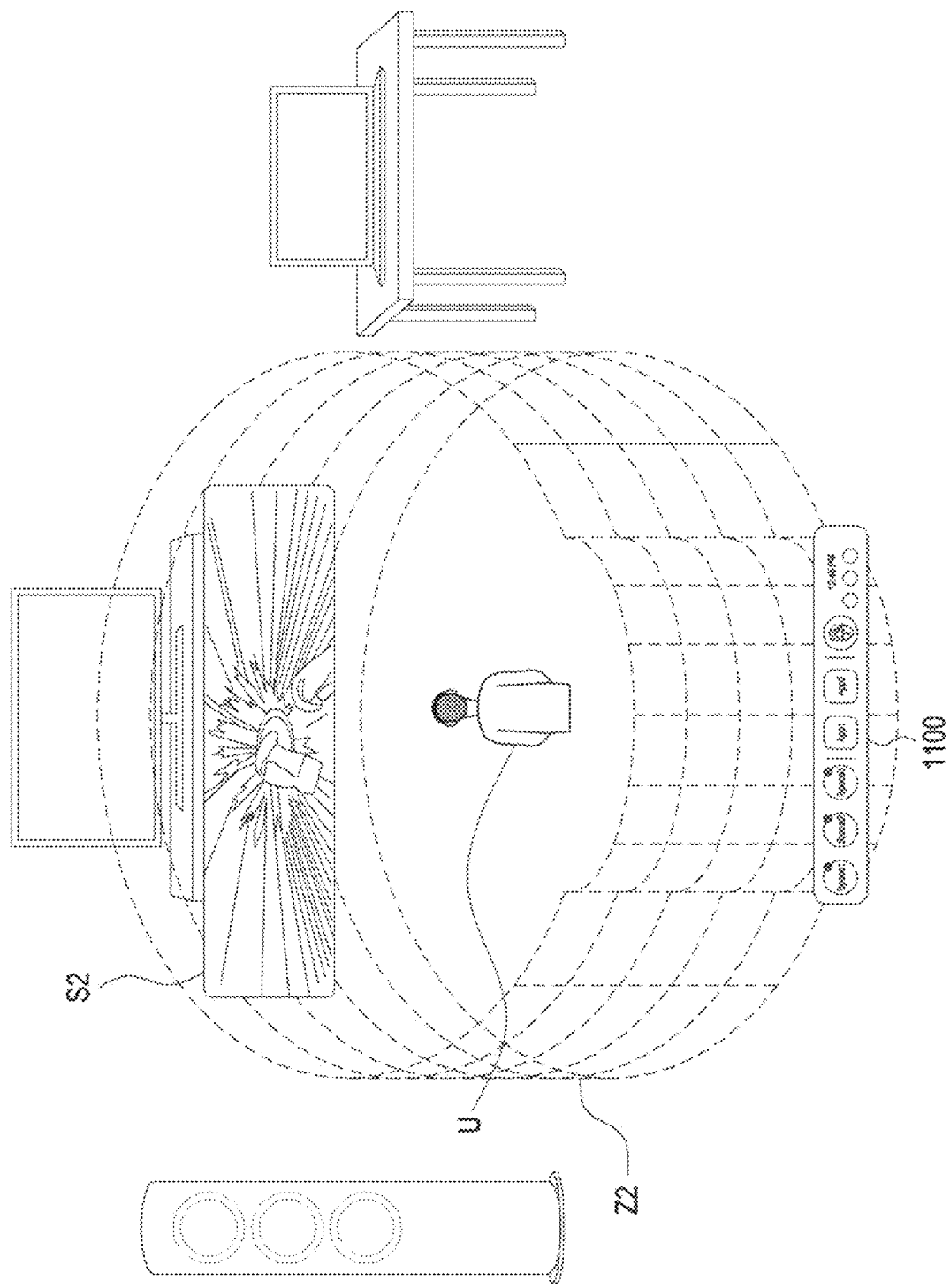
FIG. 20 illustrates a state of providing content corresponding to a second space according to one or more embodiments of the disclosure.

FIG. 19 illustrates an activated state of a second safety zone Z2 according to one or more embodiments of the disclosure. FIG. 20 illustrates a state of providing content corresponding to a second space S2 according to one or more embodiments of the disclosure.

Referring to FIGS. 19 and 20, the head-mounted device 200 according to one or more embodiments may activate the second safety zone Z2 corresponding to the second space S2 to provide content corresponding to the second space S2. In one or more embodiments, when the first safety zone Z1 (e.g., the expanded first safety zone Z1) meets the execution condition of the second space S2, the head-mounted device 200 may activate the second safety zone Z2 corresponding to the second space S2.

According to one or more embodiments, the head-mounted device 200 may identify whether the execution condition of the second space S2 is met, based on an input corresponding to at least one affordance related to the second safety zone Z2. In one or more embodiments, the head-mounted device 200 may release the display of the designated lock screen 1500 and activate the second safety zone Z2 based on the execution condition of the second space S2 being met.

The head-mounted device 200 according to one or more embodiments may provide content corresponding to the second space S2, based on the activated second safety zone Z2. In one or more embodiments, the head-mounted device 200 may display a 3D object or a 2D object in the second space S2 spaced relatively far from the user U.

In one or more embodiments, when it is identified that the first safety zone Z1 is included in the second safety zone Z2, the head-mounted device 200 may provide content corresponding to the first space S1.

Figure 21:
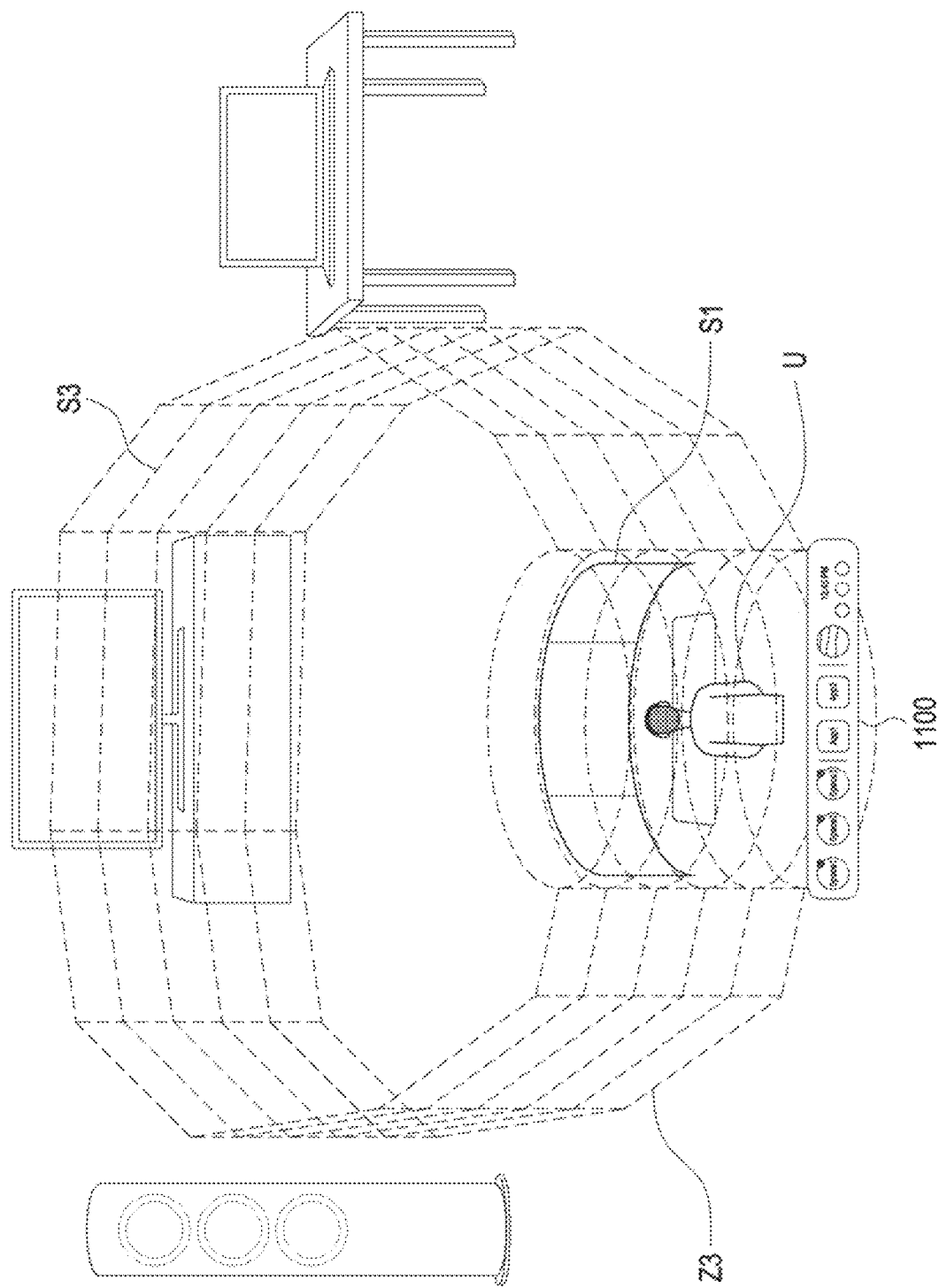
FIG. 21 illustrates an activated state of a third safety zone according to one or more embodiments of the disclosure.

FIG. 21 illustrates an activated state of a third safety zone Z3 according to one or more embodiments of the disclosure.

Referring to FIG. 21, when a request related to content corresponding to the third space S3 is obtained, the head-mounted device 200 according to one or more embodiments may identify whether an execution condition of the third space S3 is met, based on the first safety zone Z1 or the second safety zone Z2.

When the head-mounted device 200 according to one or more embodiments receives an input for providing content corresponding to the third space S3 or executes an application for providing the content corresponding to the third space S3, the head-mounted device 200 may compare the third safety zone Z3 corresponding to the third space S3 with the currently activated first safety zone Z1 or second safety zone Z2.

For example, the third safety zone Z3 may correspond to a far-view area relatively wider than the first safety zone Z1 corresponding to the near-view area or the second safety zone Z2 corresponding to the middle-view area.

The head-mounted device 200 according to one or more embodiments may identify whether the execution condition of the third space S3 is met, based on the activated first safety zone Z1 or the activated second safety zone Z2. When the execution condition of the third space S3 is not met, the head-mounted device 200 according to one or more embodiments may display at least one affordance through the display.

When the execution condition of the third space S3 is met, the head-mounted device 200 according to one or more embodiments of the disclosure may activate the third safety zone Z3 and provide content corresponding to the third space S3. In one or more embodiments, the head-mounted device 200 may provide content corresponding to the first space S1 and/or content corresponding to the second space S2 in the state in which the third safety zone Z3 is activated.

Figure 22:
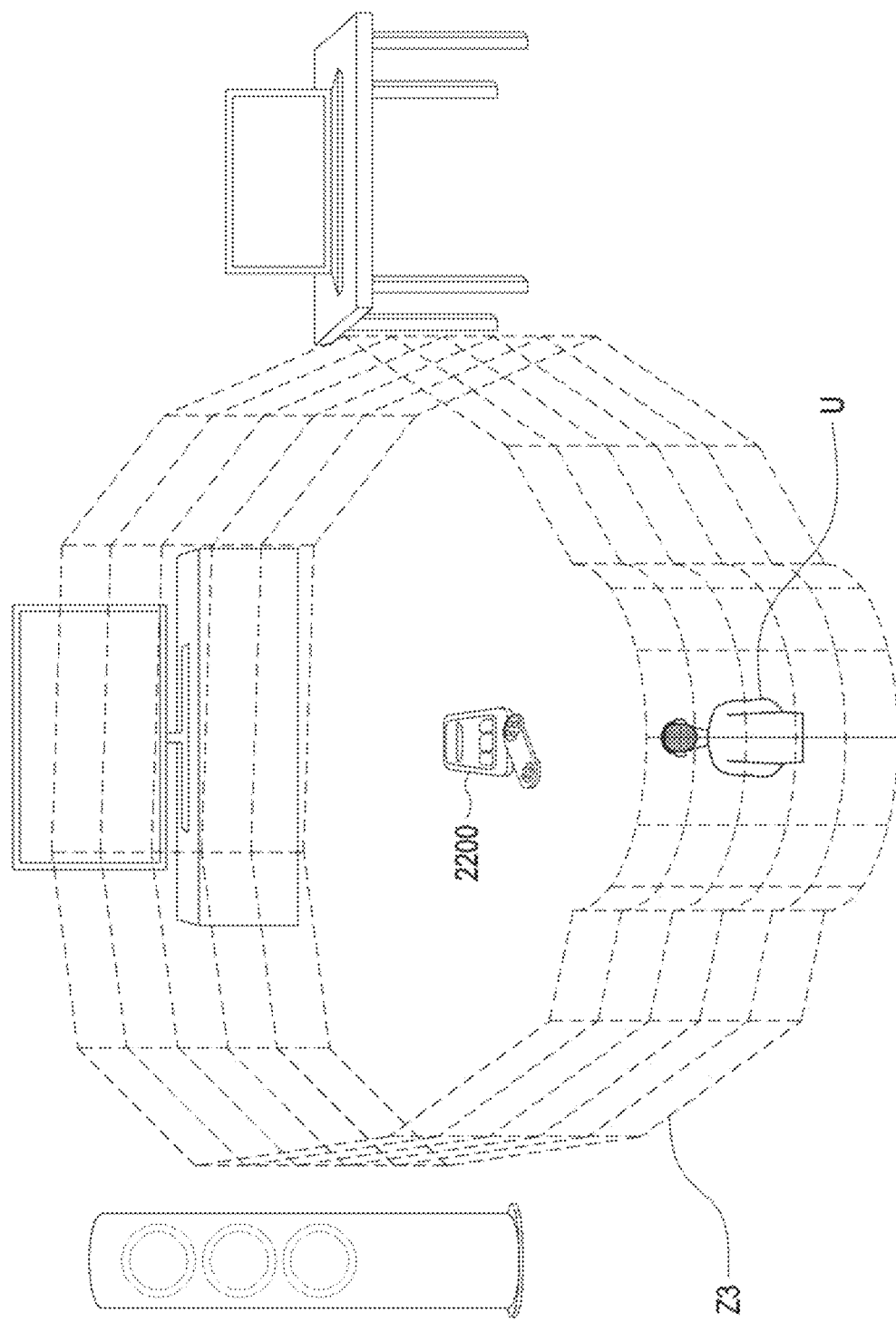
FIG. 22 shows a state of displaying a 3D object for leading to a wearer's movement according to one or more embodiments of the disclosure.

FIG. 22 is a view illustrating a state of displaying a 3D object 2200 for leading to a movement of a user U according to one or more embodiments of the disclosure.

Referring to FIG. 22, the head-mounted device 200 according to one or more embodiments may display a 3D object 2200 for leading to movement of the user U.

In one or more embodiments, the head-mounted device 200 may identify the second safety zone Z2 or the third safety zone Z3 to provide the content corresponding to the second space S2 or the content corresponding to the third space S3.

In one or more embodiments, when the head-mounted device 200 obtains a request related to the content corresponding to the second space S2 or a request related to the content corresponding to the third space S3, the head-mounted device 200 may identify the second safety zone Z2 or the third safety zone Z3. In one or more embodiments, the head-mounted device 200 may identify the second safety zone Z2 or the third safety zone Z3 based on the image of the ambient environment obtained from the camera, the data of the ambient environment obtained through the sensor circuit, and/or the data of the ambient environment received through the communication circuit.

In one or more embodiments, when the second safety zone Z2 or the third safety zone Z3, which is relatively wide compared to the activated safety zone (e.g., the first safety zone Z1), is at least partially different from the currently activated safety zone, the head-mounted device 200 may lead to the user U and/or the head-mounted device 200 moving to the identified second safety zone Z2 or third safety zone Z3. When the movement of the user U is required to activate the identified second safety zone Z2 or third safety zone Z3, the head-mounted device 200 according to one or more embodiments may display the 3D object 2200 for leading to the movement of the user U. For example, the head-mounted device 200 may lead the user U to move to the center position of the identified second safety zone Z2 or third safety zone Z3.

In one or more embodiments, when the head-mounted device 200 obtains a request related to the content corresponding to the second space S2 or a request related to the content corresponding to the third space S3, the head-mounted device 200 may identify the second safety zone Z2 or the third safety zone Z3.

For example, the 3D object 2200 may be set as an image related to content corresponding to the second space S2 or content corresponding to the third space S3. For example, when the head-mounted device 200 receives a request related to content related to the game, the head-mounted device 200 may display an image of the game console at a position where the user U is required to move in order to activate the second safety zone Z2 or the third safety zone Z3.

Figure 23:
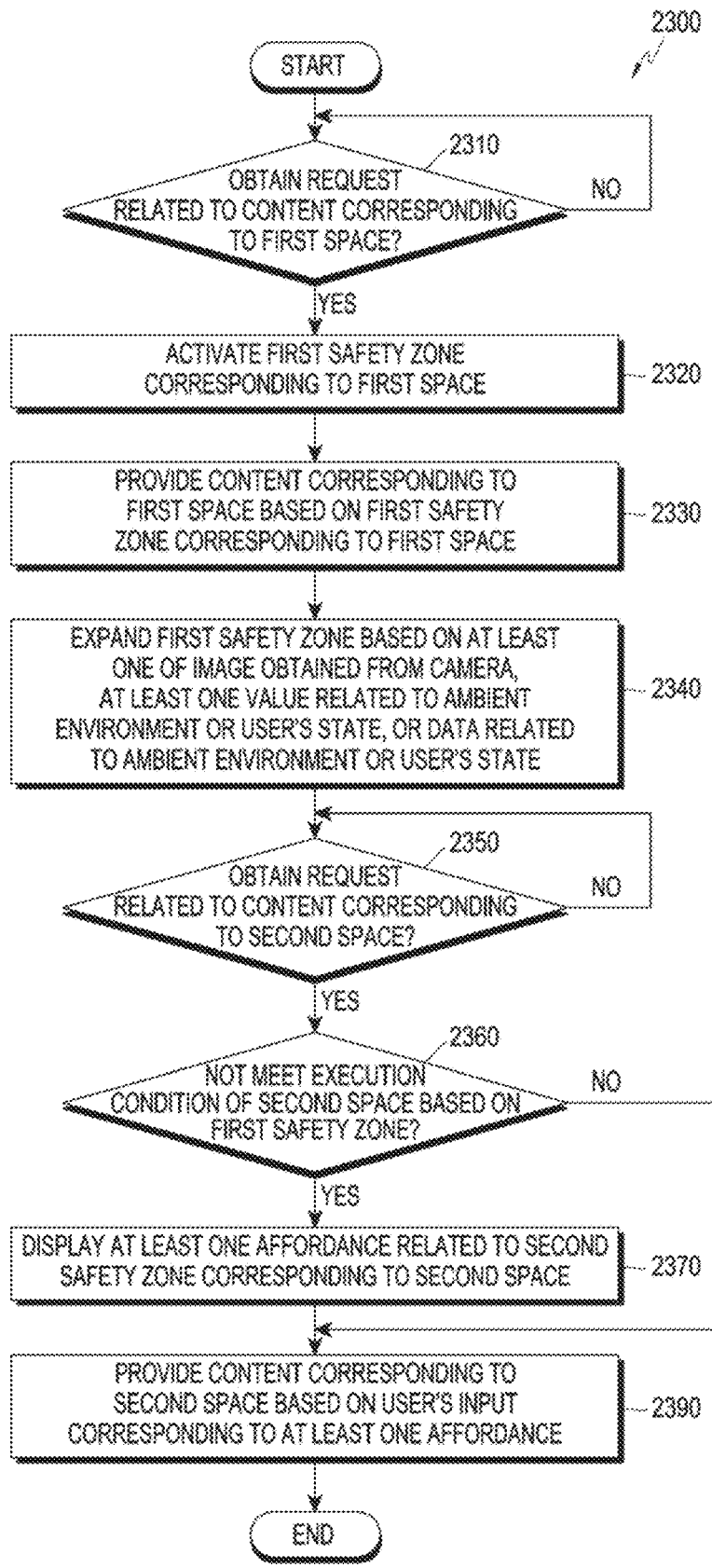
FIG. 23 is a flowchart of a method for operating a head-mounted device according to one or more embodiments of the disclosure.

FIG. 23 is a flowchart illustrating a method for operating a head-mounted device 200 or 101 according to one or more embodiments of the disclosure.

In operation 2310, the head-mounted device 200 or 101 according to one or more embodiments may identify whether a request related to the content corresponding to the first space S1 is obtained.

In one or more embodiments, when the request related to the content corresponding to the first space S1 is not obtained (No in operation 2310), the head-mounted device 200 or 101 may repeat operation 2310.

According to one or more embodiments, when the request related to the content corresponding to the first space S1 is obtained (Yes in operation 2310), the head-mounted device 200 or 101 may activate the first safety zone Z1 corresponding to the first space S1 in operation 2320.

In operation 2330, the head-mounted device 200 or 101 according to one or more embodiments may provide content corresponding to the first space S1, based on the first safety zone Z1 corresponding to the first space S1.

In operation 2340, the head-mounted device 200 or 101 according to one or more embodiments may expand the first safety zone Z1, based on at least one of an image obtained from the cameras 840, 210, 220, or 180, at least one value related to the ambient environment or the state of the user U, or data related to the ambient environment or the state of the user U.

In operation 2350, the head-mounted device 200 or 101 according to one or more embodiments may identify whether a request related to the content corresponding to the second space S2 is obtained.

In one or more embodiments, when the request related to the content corresponding to the second space S2 is not obtained (No in operation 2350), the head-mounted device 200 or 101 may repeat operation 2350.

In one or more embodiments, when the request related to the content corresponding to the second space S2 is obtained (Yes in operation 2350), in operation 2360, the head-mounted device 200 or 101 may identify whether the execution condition of the second space S2 is not met, based on the first safety zone Z1.

In one or more embodiments, when the execution condition of the second space S2 is not met (Yes in operation 2360), the head-mounted device 200 or 101 may display at least one affordance 1400, 1500, 1600, 1710, 1720, or 2200 related to the second safety zone Z2 corresponding to the second space S2 in operation 2370.

In operation 2390, the head-mounted device 200 or 101 according to one or more embodiments may provide content corresponding to the second space S2, based on an input of the user U corresponding to the at least one affordance 1400, 1500, 1600, 1710, 1720, or 2200. In one or more embodiments, when receiving an input of the user U corresponding to the at least one affordance 1400, 1500, 1600, 1710, 1720, or 2200, the head-mounted device 200 or 101 may provide content corresponding to the second space S2. According to one or more embodiments, the head-mounted device 200 or 101 may provide content corresponding to the second space S2, based on the second safety zone Z2 corresponding to the second space S2.

According to one or more embodiments, when the execution condition of the second space S2 is met (No in operation 2360), the head-mounted device 200 or 101 may provide the content corresponding to the second space S2 in operation 2390.

Figure 24A:
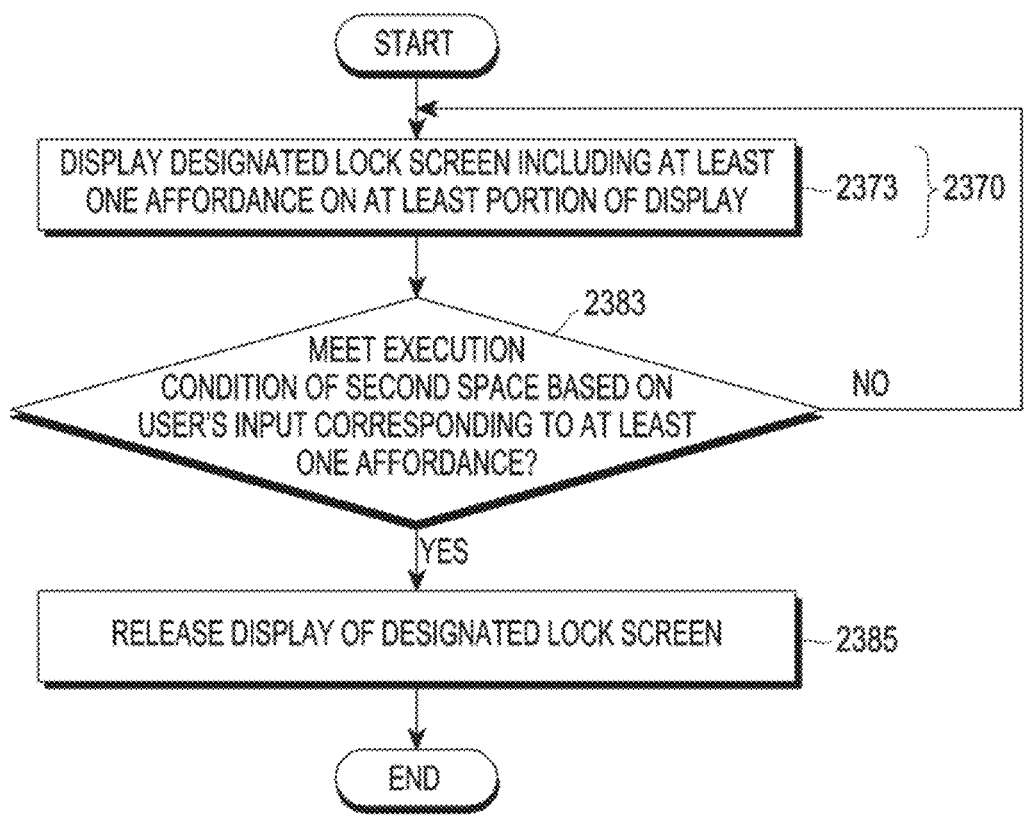
FIG. 24A shows part of the flowchart of the method for operating the head-mounted device of FIG. 23 according to one or more embodiments of the disclosure.

FIG. 24A illustrates part of the flowchart of the method for operating the head-mounted device 200 or 101 of FIG. 23 according to one or more embodiments of the disclosure.

Referring to FIG. 24A, in operation 2373, the head-mounted device 200 or 101 according to one or more embodiments may display a designated lock screen including at least one affordance 1400, 1500, 1600, 1710, 1720, or 2200 on at least a portion of the display 830, 160, or 225.

In one or more embodiments, the head-mounted device 200 or 101 may display a designated lock screen including the at least one affordance 1400, 1500, 1600, 1710, 1720, or 2200 in an operation (operation 2370 of FIG. 23) of displaying the at least one affordance 1400, 1500, 1600, 1710, 1720, or 2200 related to the second safety zone Z2 corresponding to the second space S2.

In operation 2383, the head-mounted device 200 or 101 according to one or more embodiments may identify whether the execution condition of the second space S2 is met, based on an input of the user U corresponding to the at least one affordance 1400, 1500, 1600, 1710, or 1720.

In one or more embodiments, when the execution condition of the second space S2 is not met (No in operation 2383), in operation 2373, the head-mounted device 200 or 101 may display a designated lock screen including the at least one affordance 1400, 1500, 1600, 1710, 1720, or 2200.

In one or more embodiments, when the execution condition of the second space S2 is met (Yes in operation 2383), in operation 2385, the head-mounted device 200 or 101 may release the display of the designated lock screen.

The head-mounted device 200 or 101 according to one or more embodiments may provide the content corresponding to the second space S2 based on the second safety zone Z2 corresponding to the second space S2 after the display of the designated lock screen is released (operation 2390 of FIG. 23).

Figure 24B:
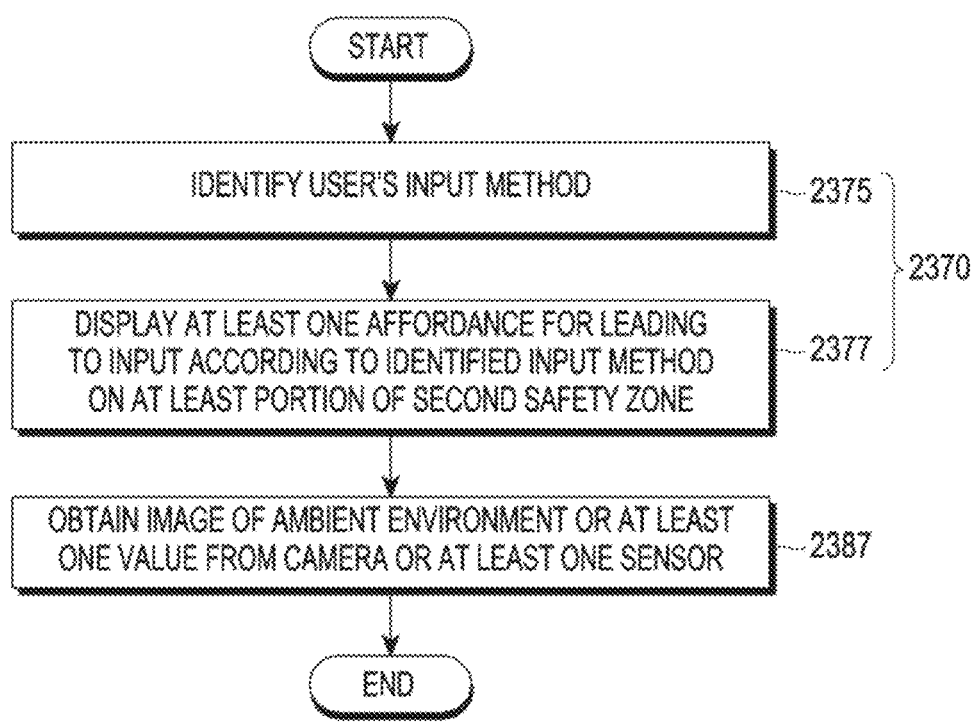
FIG. 24B shows part of the flowchart of the method for operating the head-mounted device of FIG. 23 according to one or more embodiments of the disclosure.

FIG. 24B illustrates part of the flowchart of the method for operating the head-mounted device 200 or 101 of FIG. 23 according to one or more embodiments of the disclosure.

Referring to FIG. 24B, in operation 2375, the head-mounted device 200 or 101 according to one or more embodiments may identify a method of an input of the user U. In one or more embodiments, the head-mounted device 200 or 101 may identify the input method of the user U corresponding to the at least one affordance 1400, 1500, 1600, 1710, 1720, or 2200 as displaying (operation 2370 of FIG. 23) the at least one affordance 1400, 1500, 1600, 1710, 1720, or 2200 related to the second safety zone Z2 corresponding to the second space S2.

In operation 2377, the head-mounted device 200 or 101 according to one or more embodiments may display at least one affordance 1400, 1500, 1600, 1710, 1720, or 2200 for leading to an input, according to the identified input method, to at least a portion of the second safety zone Z2. In one or more embodiments, the head-mounted device 200 or 101 may display at least one affordance 1400, 1500, 1600, 1710, 1720, or 2200 for leading to an input of the user U to expand to the second safety zone Z2 as an operation (2370 of FIG. 23) of displaying the at least one affordance 1400, 1500, 1600, 1710, 1720, or 2200 related to the second safety zone Z2 corresponding to the second space S2.

In operation 2377, the head-mounted device 200 or 101 according to one or more embodiments may obtain an image of an ambient environment or at least one value from the camera 840, 210, 220, or 180 or the at least one sensor 850 or 176. In one or more embodiments, the head-mounted device 200 or 101 may extend the activated safety zone to the second safety zone Z2 based on the obtained image of the ambient environment or at least one value.

The head-mounted device 200 or 101 according to one or more embodiments may provide the content corresponding to the second space S2 based on the second safety zone Z2 corresponding to the second space S2 after the display of the designated lock screen is released (operation 2390 of FIG. 23).

FIGS. 25A, 25B, 25C, and 25D illustrate a state of providing a designated lock screen including at least one affordance according to embodiments of the disclosure. Specifically, FIGS. 25A to 25D illustrate a state in which a designated lock screen including at least one affordance for leading to an interaction input of a user is provided when a second safety zone is activated (or expanded or changed) according to one or more embodiments of the disclosure.

Figure 25A:
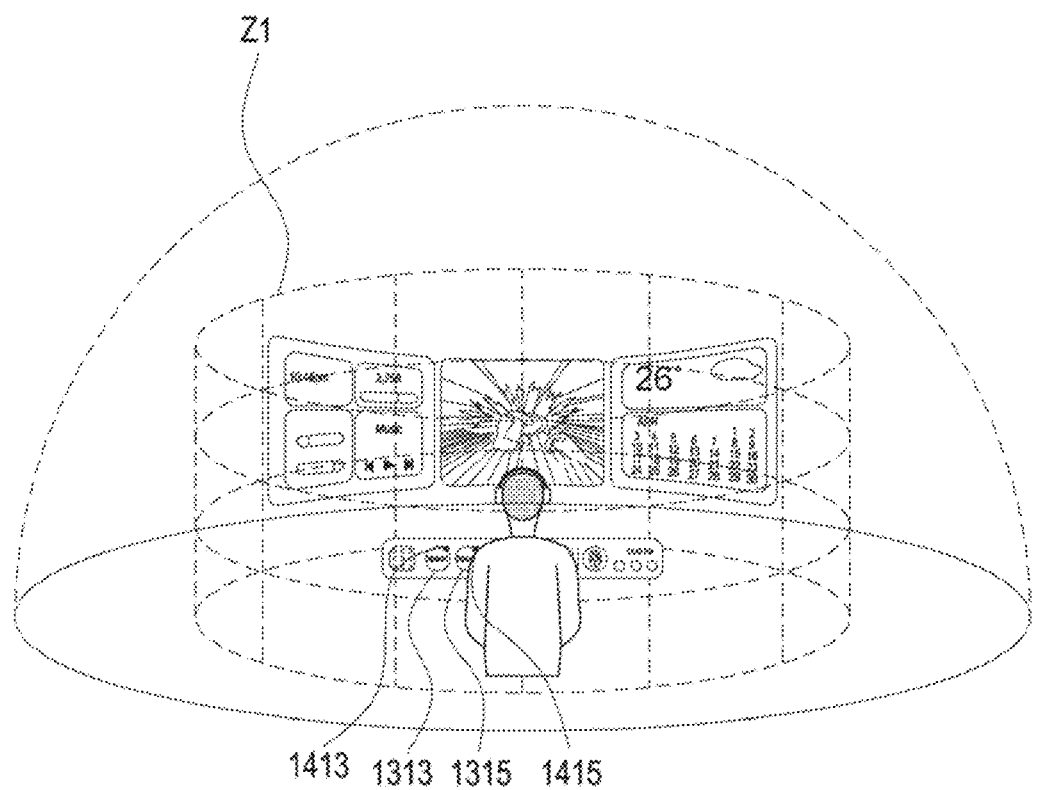
FIG. 25A shows a state of providing a designated lock screen including at least one affordance according to embodiments of the disclosure.

Referring to FIG. 25A, the head-mounted device 200 or 101 according to one or more embodiments of the disclosure may display content (e.g., a table multi-screen) corresponding to the first space S1 based on the first safety zone Z1 corresponding to the first space S1. Alternatively, in one or more embodiments, the head-mounted device 200 or 101 may display a task bar indicating a status related to the first space S1 at a designated position or area of the first space S1. Alternatively, in one or more embodiments, the head-mounted device 200 or 101 may display a home screen including content and a task bar in the first space S1. In one or more embodiments, the task bar may include a first button 1313 and a second button 1315 related to the space. In one or more embodiments, the head-mounted device 200 or 101 may display a first badge 1413 indicating the state (e.g., the active state) of the first space S1 on a first button 1313 related to the first space S1, and may display a second badge 1415 indicating the state (e.g., the inactive state) of the second space S2 on a second button 1315 related to the second space S2.

Figure 25B:
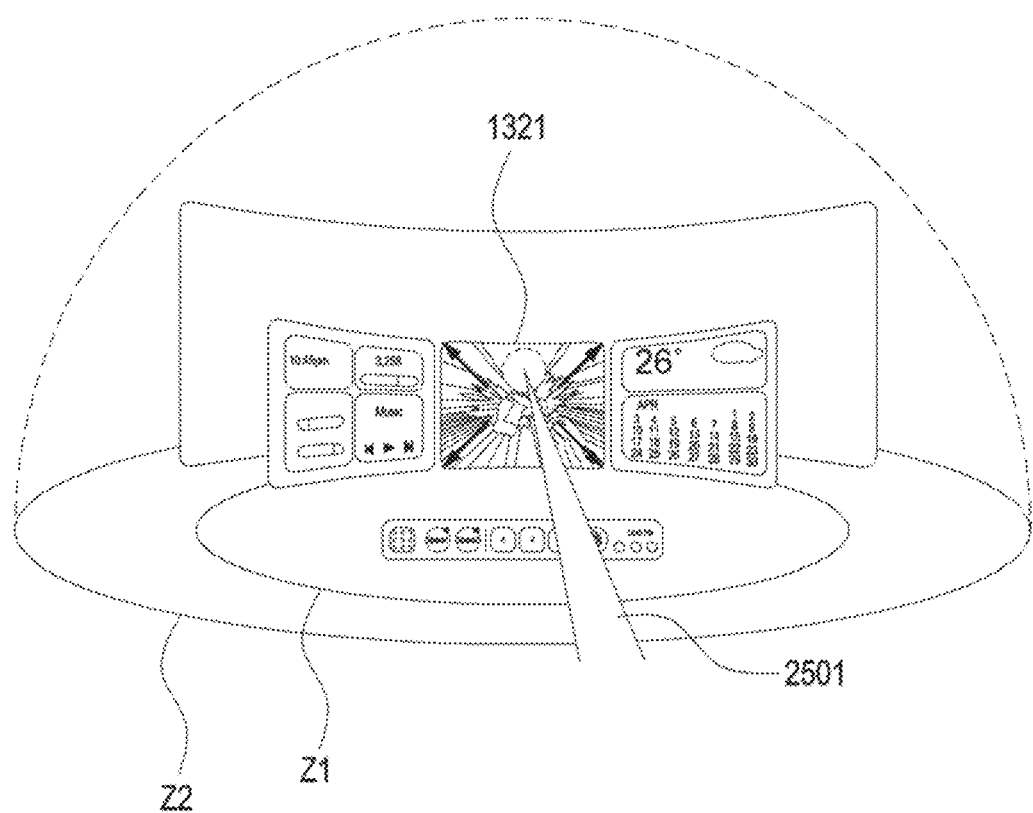
FIG. 25B shows a state of providing a designated lock screen including at least one affordance according to embodiments of the disclosure.

Referring to FIG. 25B, the head-mounted device 200 or 101 according to one or more embodiments of the disclosure may obtain an interaction input 1501 of a user related to content (e.g., an immersive application) corresponding to the second space S2. For example, the content 1321 corresponding to the second space S2 may be a game screen according to a game app. In one or more embodiments, the user interaction input 2501 may be a user input for selecting the game app, and may be, e.g., an input using a controller, a gesture input, or head tracking. In one or more embodiments, when a user input related to content corresponding to the second space S2 is obtained, the head-mounted device 200 or 101 may identify whether the execution condition of the second space S2 is met based on the first safety zone Z1. In one or more embodiments, when the second safety zone Z2 corresponding to the second space S2 is not included in the activated first safety zone Z1, the head-mounted device 200 or 101 may identify that the execution condition of the second space S2 is not met.

Figure 25C:
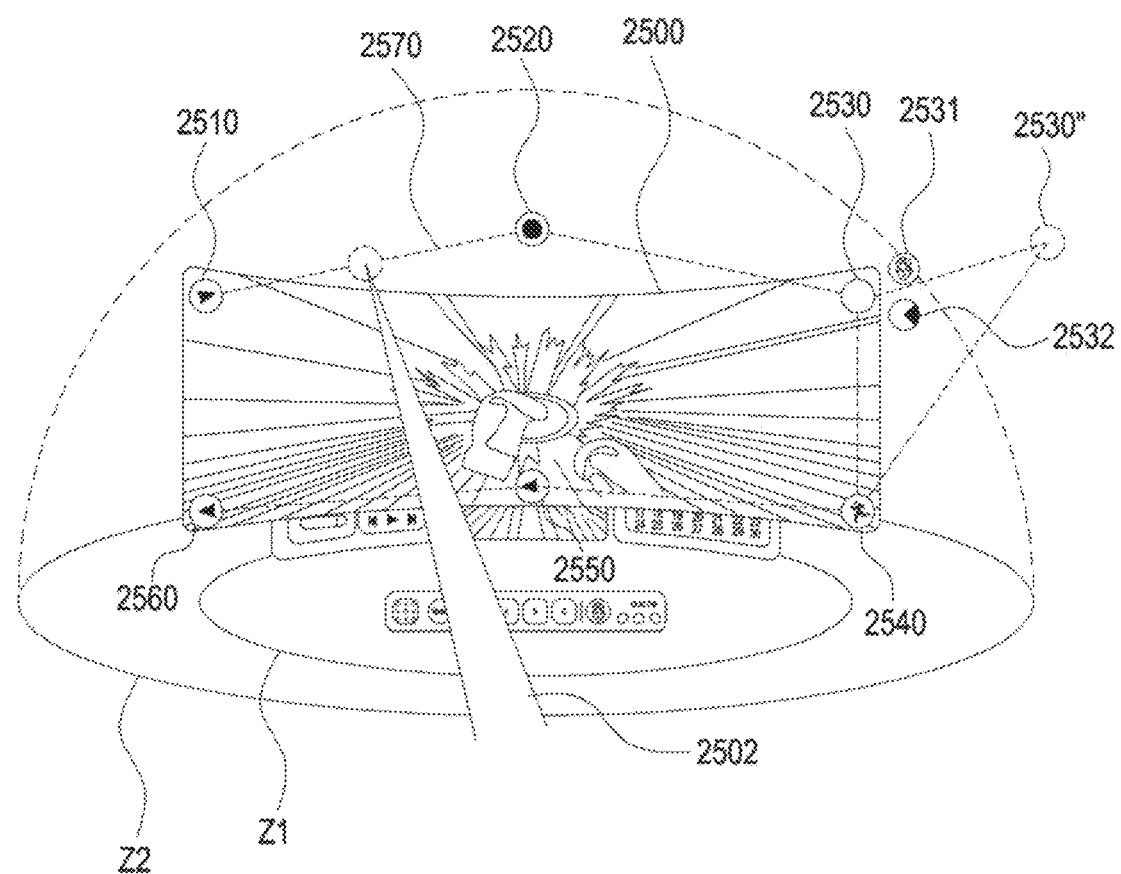
FIG. 25C shows a state of providing a designated lock screen including at least one affordance according to embodiments of the disclosure.

Referring to FIG. 25C, when it is identified that the execution condition of the second space S2 is not met, the head-mounted device 200 or 101 according to one or more embodiments of the disclosure may display a designated lock screen 2500 including at least one affordance 2510 to 2560 related to the second safety zone Z2 corresponding to the second space S2. The head-mounted device 200 or 101 according to one or more embodiments may receive an interaction input 2502 of the user while displaying the designated lock screen 2500. The designated lock screen 2500 may include at least one safety point 2510 to 2560 and a safety path 2570, and the head-mounted device 200 or 101 may receive a safety authentication input from the user corresponding to the at least one safety point 2510 to 2560 and the safety path 2570. The head-mounted device 200 or 101 according to one or more embodiments may receive a user interaction input 2502 that moves according to a designated pattern (e.g., the safety path) in response to a safety point included in the designated lock screen 2500.

In one or more embodiments, the head-mounted device 200 or 101 may provide an affordance for requesting a user interaction input (e.g., a gesture input) at a position of at least one safety point on the safety path 2570. For example, the head-mounted device 200 or 101 may provide an affordance for requesting a moving input with respect to at least one of the x-axis, the y-axis, or the z-axis at the safety point 2520. The head-mounted device 200 or 101 according to one or more embodiments may provide an affordance for additionally requesting a user interaction input at the position of the safety point on the safety path. For example, the head-mounted device 200 or 101 may provide an affordance 2531 for additionally requesting user face authentication at the safety point 2530. Alternatively, the head-mounted device 200 or 101 may provide an affordance for additionally requesting an interaction input (e.g., a request for a step or a head movement) of another surrounding wearable device at the position of the safety point 2540 on the safety path. Alternatively, in one or more embodiments, the head-mounted device 200 or 101 may provide, at the safety point 2530, an affordance 2532 for leading the current viewing angle (the first viewing angle) of the user to the second viewing angle, and when the viewing angle of the user reaches the second viewing angle, the head-mounted device 200 or 101 may analyze surrounding risk factors through the camera, and may add an affordance at the preliminary safety point 2530" for leading to the user to act in order to secure a safety zone by avoiding the risk factors. According to one or more embodiments, the input corresponding to the affordance at the safety point may differ depending on the safety level of the designated lock screen 2500. In one or more embodiments, the safety level may be derived based on a user account, a user setting, a content attribute (or a setting option), or the like. For example, the head-mounted device 200 or 101 may provide a lock screen including affordances of different strengths according to game attributes (e.g., a role-playing game or a static game) or according to a user account (e.g., gender or age).

Figure 25D:
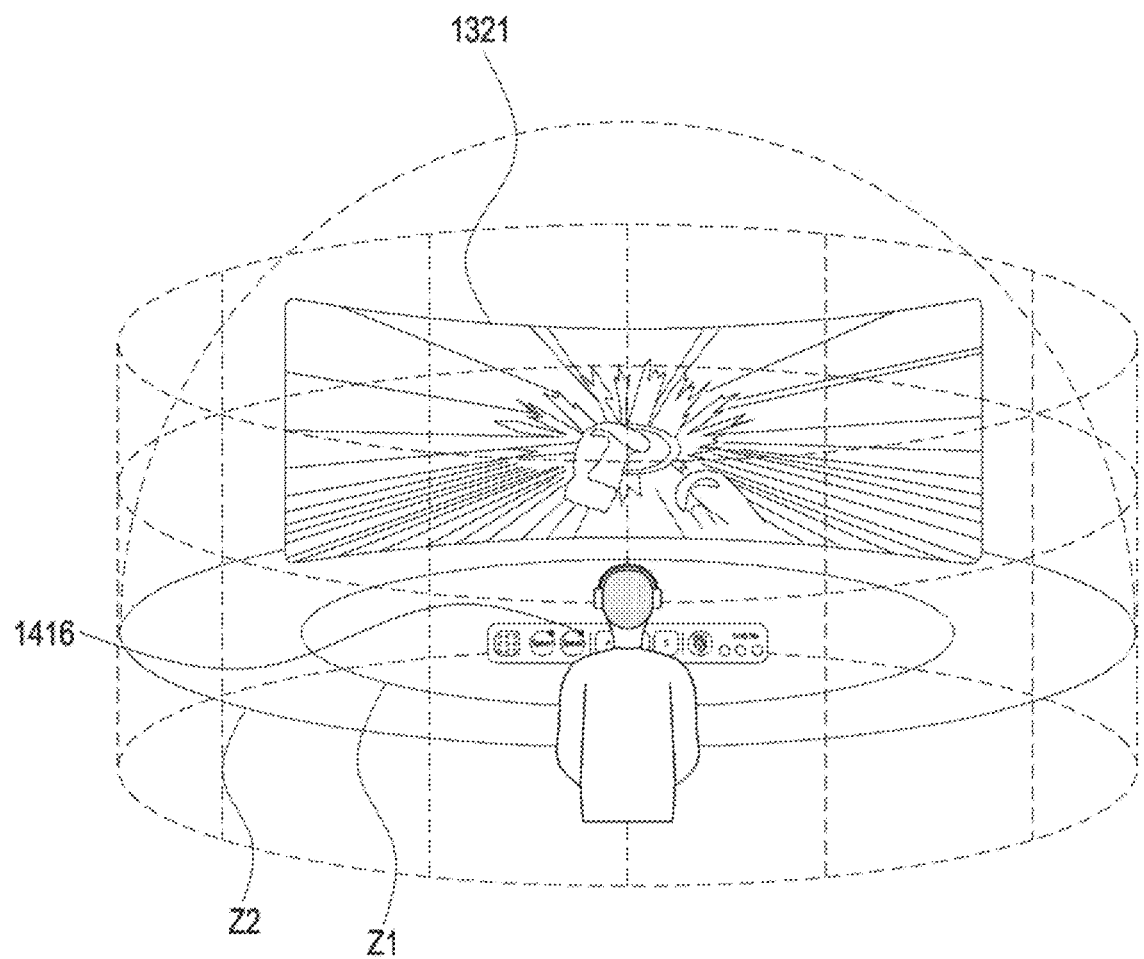
FIG. 25D shows a state of providing a designated lock screen including at least one affordance according to embodiments of the disclosure.

Referring to FIG. 25D, the head-mounted device 200 or 101 according to one or more embodiments may identify whether an execution condition of the second space S2 is met, based on an input corresponding to at least one affordance. When the execution condition of the second space S2 is met, the head-mounted device 200 or 101 may release the display of the designated lock screen 2500, activate the second safety zone Z2 corresponding to the second space S2, and display content 1321 corresponding to the second space S2. In one or more embodiments, the head-mounted device 200 or 101 may display a badge 1416 indicating a state (e.g., an activated state) of the second space on the button 1315 related to the second space S2.

Objects of the disclosure are not limited to the foregoing, and other unmentioned objects would be apparent to one of ordinary skill in the art from the following description.

Effects obtainable from the disclosure are not limited to the above-mentioned effects, and other effects not mentioned may be clearly understood by those skilled in the art from the following description.

A head-mounted device 200 or 101 according to one or more embodiments of the disclosure may comprise a display 830, 160, or 225, memory 820 or 130 storing instructions, and at least one processor 810 or 120. The instructions, when executed by the at least one processor (810; 120), cause the head-mounted device (200; 101) to provide content corresponding to a first space S1 through the display 830, 160, or 225 based on a first safety zone Z1 corresponding to the first space S1. The instructions, when executed by the at least one processor (810; 120), cause the head-mounted device (200; 101) to, based on obtaining a request related to content corresponding to a second space S2, identify whether an execution condition of the second space S2 is satisfied based on the first safety zone Z1. The instructions, when executed by the at least one processor (810; 120), cause the head-mounted device (200; 101) to display at least one affordance 1400, 1500, 1600, 1710, 1720, or 2200 related to a second safety zone Z2 corresponding to the second space S2 through the display 830, 160, or 225 based on the execution condition of the second space S2 being not satisfied. The instructions, when executed by the at least one processor (810; 120), cause the head-mounted device (200; 101) to, based on an input corresponding to the at least one affordance 1400, 1500, 1600, 1710, 1720, or 2200, provide content corresponding to the second space S2, through the display 830, 160, or 225, based on the second safety zone Z2.

In the head-mounted device 200 or 101 according to one or more embodiments, the instructions, when executed by the at least one processor (810; 120), cause the head-mounted device (200; 101) to, as at least part of providing the content corresponding to the first space S1, activate the first safety zone Z1 corresponding to the first space S1 based on obtaining a request related to the content corresponding to the first space S1.

In the head-mounted device 200 or 101, the instructions, when executed by the at least one processor (810; 120), cause the head-mounted device (200; 101) to set an area stored corresponding to one of at least one registered account or a designated nearby area as the first safety zone Z1.

The head-mounted device 200 or 101 according to one or more embodiments may further comprise a camera 840, 210, 220, or 180 configured to obtain an image of an ambient environment, at least one sensor 850 or 176 configured to obtain at least one value related to the ambient environment or a state of a user U, and a communication circuit 860 or 190 configured to transmit or receive data related to the ambient environment or the state of the user U from an external device E, 1820, or 102. In the head-mounted device 200 or 101 according to one or more embodiments, the instructions, when executed by the at least one processor (810; 120), cause the head-mounted device (200; 101) to expand the first safety zone Z1 based on at least one of an image obtained from the camera 840, 210, 220, or 180, the at least one value obtained from the at least one sensor 850 or 176, or the data obtained from the communication circuit 860 or 190.

In the head-mounted device 200 or 101 according to one or more embodiments, the instructions, when executed by the at least one processor (810; 120), cause the head-mounted device (200; 101) to, as at least part of identifying whether the execution condition of the second space S2 is satisfied, identify whether the second safety zone Z2 corresponding to the second space S2 is included in the first safety zone Z1.

In the head-mounted device 200 or 101 according to one or more embodiments, the instructions, when executed by the at least one processor (810; 120), cause the head-mounted device (200; 101) to, as at least part of displaying the at least one affordance 1400, 1500, 1600, 1710, 1720, or 2200, display a designated lock screen including the at least one affordance 1400, 1500, 1600, 1710, 1720, or 2200 on at least a portion of the display 830, 160, or 225. In the head-mounted device 200 or 101 according to one or more embodiments, the instructions, when executed by the at least one processor (810; 120), cause the head-mounted device (200; 101) to identify whether the execution condition of the second space S2 is satisfied based on an input corresponding to the at least one affordance 1400, 1500, 1600, 1710, 1720, or 2200. In the head-mounted device 200 or 101 according to one or more embodiments, the instructions, when executed by the at least one processor (810; 120), cause the head-mounted device (200; 101) to release the display of the designated lock screen based on the execution condition of the second space S2 being satisfied.

In the head-mounted device 200 or 101 according to one or more embodiments, the instructions, when executed by the at least one processor (810; 120), cause the head-mounted device (200; 101) to display a task bar 1100 displaying a state related to a space or an application executed. the instructions, when executed by the at least one processor (810; 120), cause the head-mounted device (200; 101) to, as at least part of displaying the at least one affordance 1400, 1500, 1600, 1710, 1720, or 2200, display the at least one affordance 1400, 1500, 1600, 1710, 1720, or 2200 displaying whether the execution condition of the second space S2 is satisfied, on the task bar 1100.

In the head-mounted device 200 or 101 according to one or more embodiments, the instructions, when executed by the at least one processor (810; 120), cause the head-mounted device (200; 101) to, as at least part of displaying the at least one affordance 1400, 1500, 1600, 1710, 1720, or 2200, identify a method of an input corresponding to the at least one affordance 1400, 1500, 1600, 1710, 1720, or 2200, and display the at least one affordance 1400, 1500, 1600, 1710, 1720, or 2200 for guiding the input according to the method of the input.

The head-mounted device 200 or 101 according to one or more embodiments may further comprise a camera 840, 210, 220, or 180 configured to obtain an image of an ambient environment and at least one sensor 850 or 176 configured to obtain at least one value related to the ambient environment or a state of a user U. The instructions, when executed by the at least one processor (810; 120), cause the head-mounted device (200; 101) to, as at least part of displaying the at least one affordance 1400, 1500, 1600, 1710, 1720, or 2200 for guiding the input, display the at least one affordance 1400, 1500, 1600, 1710, 1720, or 2200 for guiding a gaze input of the user U. The instructions, when executed by the at least one processor (810; 120), cause the head-mounted device (200; 101) to obtain an image of the ambient environment or the at least one value from the camera 840, 210, 220, or 180 or the at least one sensor 850 or 176 based on the gaze input.

The head-mounted device 200 or 101 according to one or more embodiments may further comprise a camera 840, 210, 220, or 180 configured to obtain an image of an ambient environment and at least one sensor 850 or 176 configured to obtain at least one value related to the ambient environment or a state of a user U. The instructions, when executed by the at least one processor (810; 120), cause the head-mounted device (200; 101) to, as at least part of displaying the at least one affordance 1400, 1500, 1600, 1710, 1720, or 2200 for guiding the input, display the at least one affordance 1400, 1500, 1600, 1710, 1720, or 2200 for guiding a motion input of the user U. The instructions, when executed by the at least one processor (810; 120), cause the head-mounted device (200; 101) to obtain an image of the ambient environment or the at least one value from the camera 840, 210, 220, or 180 or the at least one sensor 850 or 176 based on the motion input.

In the head-mounted device 200 or 101 according to one or more embodiments, the instructions, when executed by the at least one processor (810; 120), cause the head-mounted device (200; 101) to, as at least part of providing the content corresponding to the second space S2, display a 3D object 2200 for guiding a movement of the user U based on the second safety zone Z2.

An operation method of a head-mounted device 200 or 101 according to one or more embodiments may comprise providing content corresponding to a first space S1 through a display 830, 160, or 225 based on a first safety zone Z1 corresponding to the first space S1. The operation method of the head-mounted device 200 or 101 according to one or more embodiments may comprise, when obtaining a request related to content corresponding to a second space S2, identifying whether an execution condition of the second space S2 is satisfied based on the first safety zone Z1. The operation method of the head-mounted device 200 or 101 according to one or more embodiments may comprise displaying at least one affordance 1400, 1500, 1600, 1710, 1720, or 2200 related to a second safety zone Z2 corresponding to the second space S2 through the display 830, 160, or 225 based on the execution condition of the second space S2 being not satisfied 2360. The operation method of the head-mounted device 200 or 101 according to one or more embodiments may comprise providing content corresponding to the second space S2 based on the second safety zone Z2 through the display 830, 160, or 225 based on an input corresponding to the at least one affordance 1400, 1500, 1600, 1710, 1720, or 2200.

In the operation method of the head-mounted device 200 or 101 according to one or more embodiments, providing (2330) the content corresponding to the first space S1 may include activating (2320) the first safety zone Z1 corresponding to the first space S1 based on obtaining 2310 a request related to the content corresponding to the first space S1.

The operation method of the head-mounted device 200 or 101 according to one or more embodiments may further comprise expanding (2340) the first safety zone Z1 based on at least one of an image of an ambient environment obtained from a camera 840, 210, 220, or 180, at least one value related to the ambient environment or a state of a user U obtained from at least one sensor 850 or 176, or data related to the ambient environment or the state of the user U obtained through a communication circuit 860 or 190 from an external device E, 1820, or 102.

In the operation method of the head-mounted device 200 or 101 according to one or more embodiments, displaying (2370) the at least one affordance 1400, 1500, 1600, 1710, 1720, or 2200 may display (2373) a designated lock screen including the at least one affordance 1400, 1500, 1600, 1710, 1720, or 2200 on at least a portion of the display 830, 160, or 225. The operation method of the head-mounted device 200 or 101 according to one or more embodiments may further comprise identifying (2383) whether the execution condition of the second space S2 is satisfied based on an input corresponding to the at least one affordance 1400, 1500, 1600, 1710, 1720, or 2200. The operation method of the head-mounted device 200 or 101 according to one or more embodiments may further comprise releasing (2385) the display of the designated lock screen based on the execution condition of the second space S2 being satisfied.

In the operation method of the head-mounted device 200 or 101 according to one or more embodiments, displaying (2370) the at least one affordance 1400, 1500, 1600, 1710, 1720, or 2200 may display the at least one affordance 1400, 1500, 1600, 1710, 1720, or 2200 displaying whether the execution condition of the second space S2 is satisfied, on a task bar 1100 displaying a state related to a space or an application executed.

In the operation method of the head-mounted device 200 or 101 according to one or more embodiments, displaying (2370) the at least one affordance 1400, 1500, 1600, 1710, 1720, or 2200 may include identifying (2375) a method of an input corresponding to the at least one affordance 1400, 1500, 1600, 1710, 1720, or 2200, and displaying (2377) the at least one affordance 1400, 1500, 1600, 1710, 1720, or 2200 for guiding the input according to the method of the input, on at least a portion of the second safety zone Z2.

In the operation method of the head-mounted device 200 or 101 according to one or more embodiments, displaying (2377) the at least one affordance 1400, 1500, 1600, 1710, 1720, or 2200 for guiding the input may display the at least one affordance 1400, 1500, 1600, 1710, 1720, or 2200 for guiding a gaze input of the user U. The operation method of the head-mounted device 200 or 101 according to one or more embodiments according to one or more embodiments may further comprise obtaining (2387) an image of an ambient environment from a camera 840, 210, 220, or 180 or obtaining at least one value related to the ambient environment or the state of the user U obtained from at least one sensor 850 or 176, based on the gaze input.

In the operation method of the head-mounted device 200 or 101 according to one or more embodiments, displaying (2377) the at least one affordance 1400, 1500, 1600, 1710, 1720, or 2200 for guiding the input may display the at least one affordance 1400, 1500, 1600, 1710, 1720, or 2200 for guiding a motion input of the user U. The operation method of the head-mounted device 200 or 101 according to one or more embodiments may further comprise obtaining (2387) an image of an ambient environment from a camera 840, 210, 220, or 180 or obtaining at least one value related to the ambient environment or the state of the user U obtained from at least one sensor 850 or 176, based on the motion input.

In the operation method of the head-mounted device 200 or 101 according to one or more embodiments, providing (2390) the content corresponding to the second space S2 may display a 3D object 2200 for guiding a movement of the user U based on the second safety zone Z2.

A non-transitory computer readable medium storing instructions that, when executed by at least one processor (810; 120) of a head-mounted device (200; 101), cause the head-mounted device (200; 101) to provide content corresponding to a first space S1 through a display 830, 160, or 225 based on a first safety zone Z1 corresponding to the first space S1 based on execution of an application. The instructions, when executed by the at least one processor (810; 120), cause the head-mounted device (200; 101) to, based on obtaining a request related to content corresponding to a second space S2, identify whether an execution condition of the second space S2 is satisfied based on the first safety zone Z1. The instructions, when executed by the at least one processor (810; 120), cause the head-mounted device (200; 101) to display at least one affordance 1400, 1500, 1600, 1710, 1720, or 2200 related to a second safety zone Z2 corresponding to the second space S2 through the display 830, 160, or 225 based on the execution condition of the second space S2 being not satisfied. The instructions, when executed by the at least one processor (810; 120), cause the head-mounted device (200; 101) to, based on an input corresponding to the at least one affordance 1400, 1500, 1600, 1710, 1720, or 2200, provide content corresponding to the second space S2, through the display 830, 160, or 225, based on the second safety zone Z2.

The electronic device according to an embodiment may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A head-mounted device, comprising:
a display;
memory comprising one or more storage media storing instructions; and
at least one processor comprising processing circuitry, wherein the instructions, when executed by the at least one processor individually or collectively, cause the head-mounted device to:
provide, through the display, a first content corresponding to a first space including a first safety zone;
based on obtaining a request to provide, through the display, a second content corresponding to a second space including a second safety zone, identify whether a second execution condition of the second safety zone meets a first execution condition of the first safety zone;
based on identifying that the second execution condition meets the first execution condition, provide, through the display, the second content corresponding to the second space including the second safety zone;
based on identifying that the second execution condition does not meet the first execution condition:
display, through the display, a designated lock screen including at least one affordance object relevant to the second space,
receive an input corresponding to the at least one affordance object, and
based on receiving the input corresponding to the at least one affordance object, release the display of the designated lock screen and provide, through the display, the second content corresponding to the second space including the second safety zone.

2. The head-mounted device of claim 1, wherein the instructions, when executed by the at least one processor individually or collectively, cause the head-mounted device to:
as at least part of providing the first content corresponding to the first space, activate the first safety zone corresponding to the first space based on obtaining a request related to the first content corresponding to the first space.

3. The head-mounted device of claim 1, wherein the instructions, when executed by the at least one processor individually or collectively, cause the head-mounted device to:
set an area stored corresponding to one of at least one registered account or a designated nearby area as the first safety zone.

4. The head-mounted device of claim 1, further comprising:
a camera configured to obtain an image of an ambient environment;
at least one sensor configured to obtain at least one value related to the ambient environment or a state of a user; and
communication circuitry configured to transmit or receive data, related to the ambient environment or the state of the user, from an external device,
wherein the instructions, when executed by the at least one processor individually or collectively, cause the head-mounted device to:
expand the first safety zone based on at least one of the image obtained from the camera, the at least one value obtained from the at least one sensor, or the data obtained from the communication circuitry.

5. The head-mounted device of claim 1, wherein the instructions, when executed by the at least one processor individually or collectively, cause the head-mounted device to:
as at least part of identifying whether the second execution condition of the second safety zone meets the first execution condition of the first safety zone, identify whether the second safety zone corresponding to the second space is included in the first safety zone.

6. The head-mounted device of claim 1, wherein the instructions, when executed by the at least one processor individually or collectively, cause the head-mounted device to:
display a task bar which displays a state related to a space or an application executed, and
wherein the at least one affordance object is displayed on the task bar.

7. The head-mounted device of claim 1, wherein the instructions, when executed by the at least one processor individually or collectively, cause the head-mounted device to, as at least part of displaying the designated lock screen including the at least one affordance object:
identify a method of the input corresponding to the at least one affordance object,
wherein the at least one affordance object is displayed based on the method of the input.

8. The head-mounted device of claim 1, further comprising:
a camera configured to obtain an image of an ambient environment; and
at least one sensor configured to obtain at least one value related to the ambient environment or a state of a user,
wherein the instructions, when executed by the at least one processor individually or collectively, cause the head-mounted device to:
as at least part of displaying the designated lock screen including the at least one affordance object, display the at least one affordance object for guiding a gaze input of the user; and
obtain the image of the ambient environment from the camera or the at least one value from the at least one sensor based on the gaze input.

9. The head-mounted device of claim 1, further comprising:
a camera configured to obtain an image of an ambient environment; and
at least one sensor configured to obtain at least one value related to the ambient environment or a state of a user,
wherein the instructions, when executed by the at least one processor individually or collectively, cause the head-mounted device to:
as at least part of displaying the designated lock screen including the at least one affordance object, display the at least one affordance object for guiding a motion input of the user; and
obtain the image of the ambient environment from the camera or the at least one value from the at least one sensor based on the motion input.

10. The head-mounted device of claim 1, wherein the instructions, when executed by the at least one processor individually or collectively, cause the head-mounted device to:
as at least part of providing the second content corresponding to the second space, display a 3D object for guiding a movement of a user based on the second safety zone.

11. The head-mounted device of claim 1, wherein the instructions, when executed by the at least one processor individually or collectively, cause the head-mounted device to:
as at least part of displaying the designated lock screen including the at least one affordance object, display a 3D object for guiding a movement of a user based on the second safety zone.

12. An operation method of a head-mounted device, the operation method comprising:
providing, through a display, a first content corresponding to a first space including a first safety zone;
based on obtaining a request to provide, through the display, a second content corresponding to a second space including a second safety zone, identifying whether a second execution condition of the second safety zone meets a first execution condition of the first safety zone;
based on identifying that the second execution condition meets the first execution condition, providing, through the display, the second content corresponding to the second space including the second safety zone;
based on identifying that the second execution condition does not meet the first execution condition:
displaying, through the display, a designated lock screen including at least one affordance object relevant to the second space,
receiving an input corresponding to the at least one affordance object, and
based on receiving the input corresponding to the at least one affordance object, releasing the display of the designated lock screen and providing, through the display, the second content corresponding to the second space including the second safety zone.

13. The operation method of claim 12, further comprising:
expanding the first safety zone based on at least one of an image of an ambient environment obtained from a camera, at least one value related to the ambient environment or a state of a user obtained from at least one sensor, or data related to the ambient environment or the state of the user obtained through a communication circuitry from an external device.

14. The operation method of claim 12, wherein the at least one affordance, object is displayed on a task bar which displays a state related to a space or an application executed.

15. The operation method of claim 12, wherein displaying the at least one affordance object comprises:
identifying a method of the input corresponding to the at least one affordance object, and wherein the at least one affordance object is displayed based on the method of the input.

16. The operation method of claim 15, wherein displaying the designated lock screen including the at least one affordance object displays the at least one affordance object for guiding a motion input of a user, the operation method further comprising:
obtaining an image of an ambient environment from a camera or obtaining at least one value related to the ambient environment or a state of the user obtained from at least one sensor, based on the motion input.

17. The operation method of claim 12, wherein displaying the designated lock screen including the at least one affordance object displays the at least one affordance object for guiding a gaze input of a user, the operation method further comprising:
obtaining an image of an ambient environment from a camera or obtaining at least one value related to the ambient environment or a state of the user obtained from at least one sensor, based on the gaze input.

18. The operation method of claim 12, wherein displaying the designated lock screen including the at least one affordance object comprises:
displaying a 3D object for guiding a movement of a user based on the second safety zone.

19. A non-transitory computer readable medium storing instructions that, when executed by at least one processor of a head-mounted device, cause the head-mounted device to:
provide, through a display, a first content corresponding to a first space includingthrough a display based on a first safety zone corresponding to the first space;
based on obtaining a request related toto provide, through the display, a second content corresponding to a second space including a second safety zone, identify whether a second an execution condition of the second safety zone meets a first execution condition of the first safety zonespace is satisfied based on the first safety zone;
based on identifying that the second execution condition meets the first execution condition, provide, through the display, the second content corresponding to the second space including the second safety zone;
based on identifying that the second execution condition does not meet the first execution condition:
display, through the display, a designated lock screen including at least one affordance object relevant to the second space, receive an input corresponding to the at least one affordance object, and based on receiving the input corresponding to the at least one affordance object, release the display of the designated lock screen and provide, through the display, the second content corresponding to the second space including the second safety zonedisplay at least one affordance related to a second safety zone corresponding to the second space through the display based on the execution condition of the second space being not satisfied; and
based on an input corresponding to the at least one affordance, provide the content corresponding to the second space, through the display, based on the second safety zone.

20. The non-transitory computer readable medium of claim 19, wherein the instructions, when executed by the at least one processor, cause the head-mounted device to:
as at least part of displaying the designated lock screen including the at least one affordance object, display a 3D object for guiding a movement of a user based on the second safety zone.

* * * * *